(12) United States Patent
Asgari et al.

(10) Patent No.: US 6,369,974 B1
(45) Date of Patent: Apr. 9, 2002

(54) DISK DRIVE WITH METHOD OF CONSTRUCTING A CONTINUOUS POSITION SIGNAL AND CONSTRAINED METHOD OF LINEARIZING SUCH POSITION SIGNAL WHILE MAINTAINING CONTINUITY

(75) Inventors: Saeed Asgari; Mark D. Hagen, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/248,087

(22) Filed: Feb. 9, 1999

(51) Int. Cl.[7] .................................................. G11B 5/596
(52) U.S. Cl. ........................................ 360/78.14; 360/75
(58) Field of Search ........................... 360/78.14, 78.08, 360/48, 49, 25, 29, 39, 77.11, 75, 77.04

(56) References Cited

U.S. PATENT DOCUMENTS

| 5,600,506 A | | 2/1997 | Baum et al. | |
|---|---|---|---|---|
| 5,825,579 A | * | 10/1998 | Cheung et al. | 360/77.08 |
| 5,825,580 A | * | 10/1998 | Shibata | 360/77.08 |
| 5,892,634 A | * | 4/1999 | Ito et al. | 360/77.08 |
| 5,946,158 A | * | 8/1999 | Nazarian et al. | 360/77.04 |
| 5,982,173 A | * | 11/1999 | Hagen et al. | 360/77.04 X |
| 6,091,567 A | * | 7/2000 | Cooper et al. | 360/77.08 |

* cited by examiner

*Primary Examiner*—David Hudspeth
*Assistant Examiner*—K. Wong
(74) *Attorney, Agent, or Firm*—Milad G Shara

(57) ABSTRACT

A method for constructing and linearizing a position error signal (PES) derived from primary and quadrature servo burst pairs in an embedded servo disk drive. The construction method mathematically provides predetermined transition values at the commutation positions connecting adjacent PES segments so that the overall, indicated position signal is numerically continuous from segment to segment. The linearization method compensates for nonlinearity in the PES segments, and thereby in the indicated position signal, without affecting the predetermined transition values at all, or by modifying the predetermined transition values while maintaining continuity.

16 Claims, 10 Drawing Sheets

P/Q SEGMENTS - NO SPACING ERROR

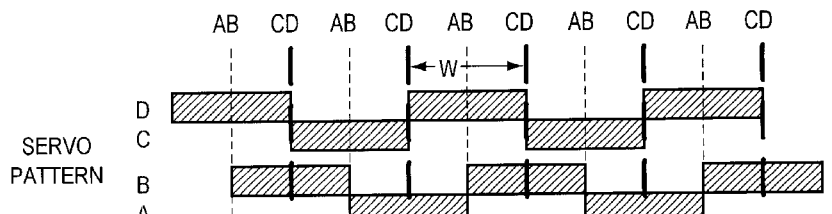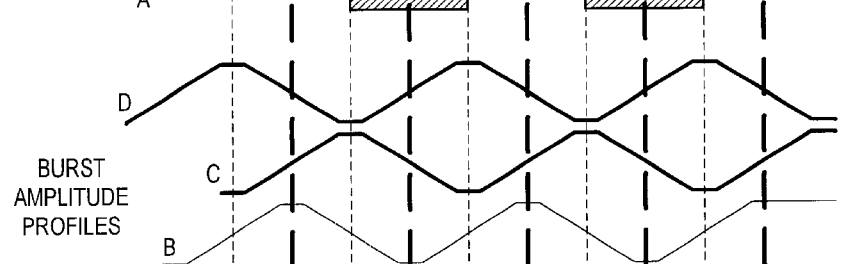

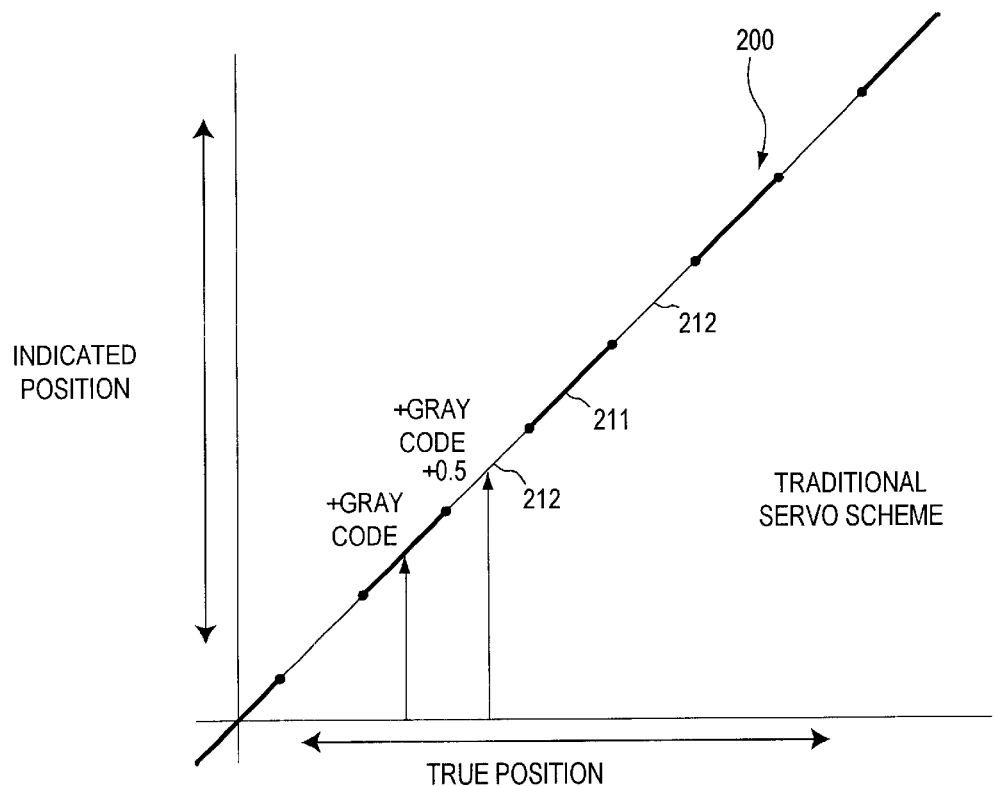
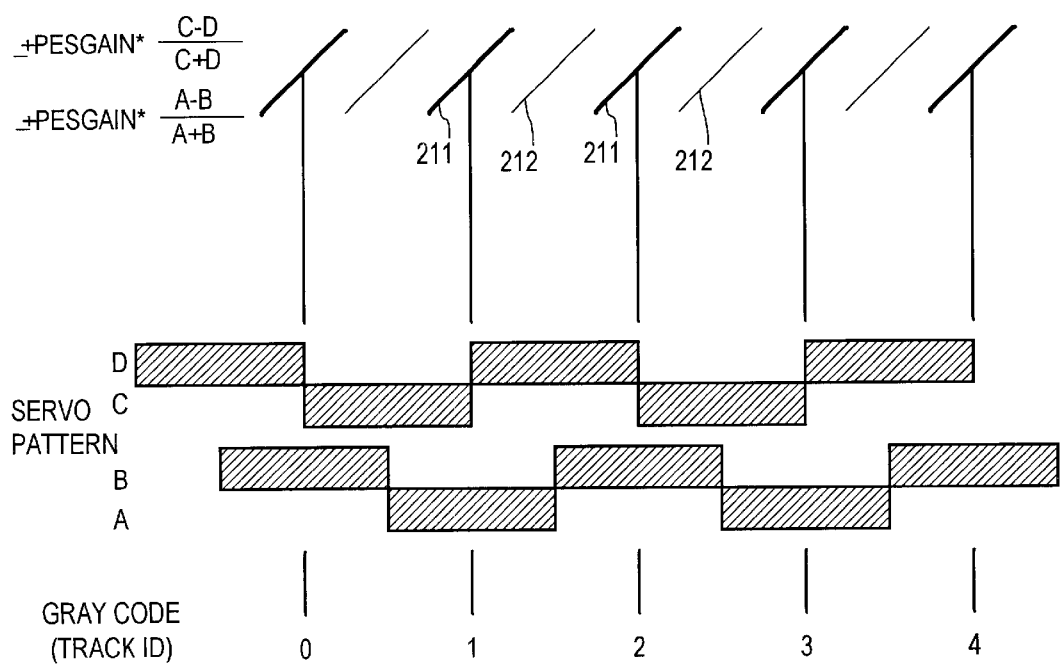
FIG. 7
PRIOR ART - NO SPACING ERROR

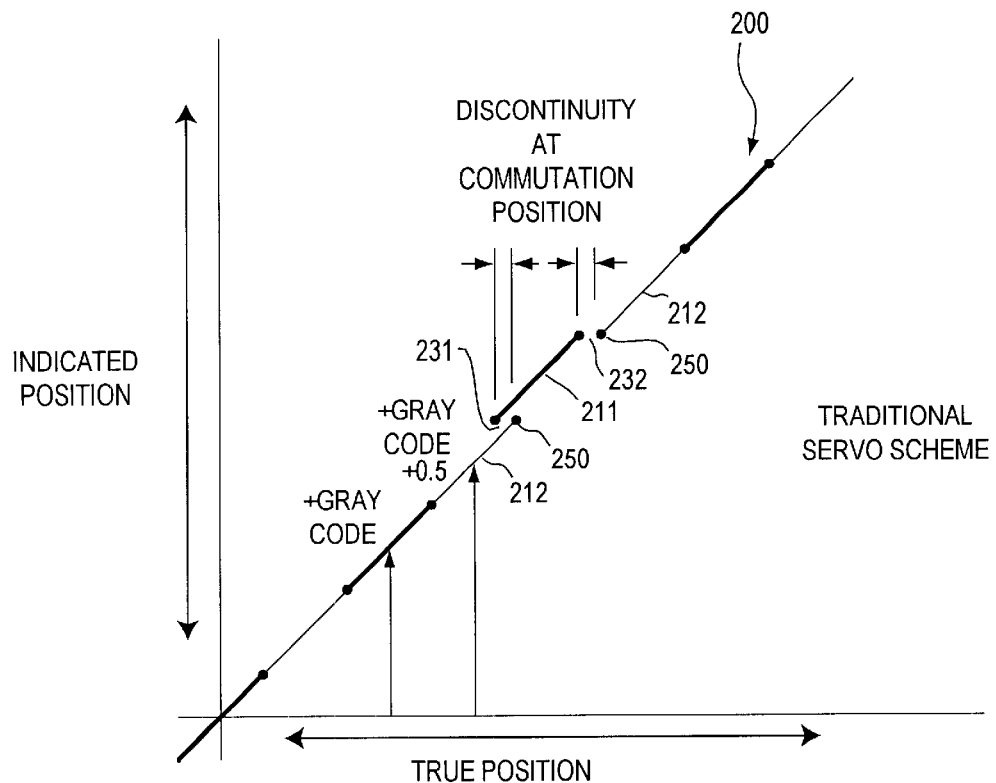
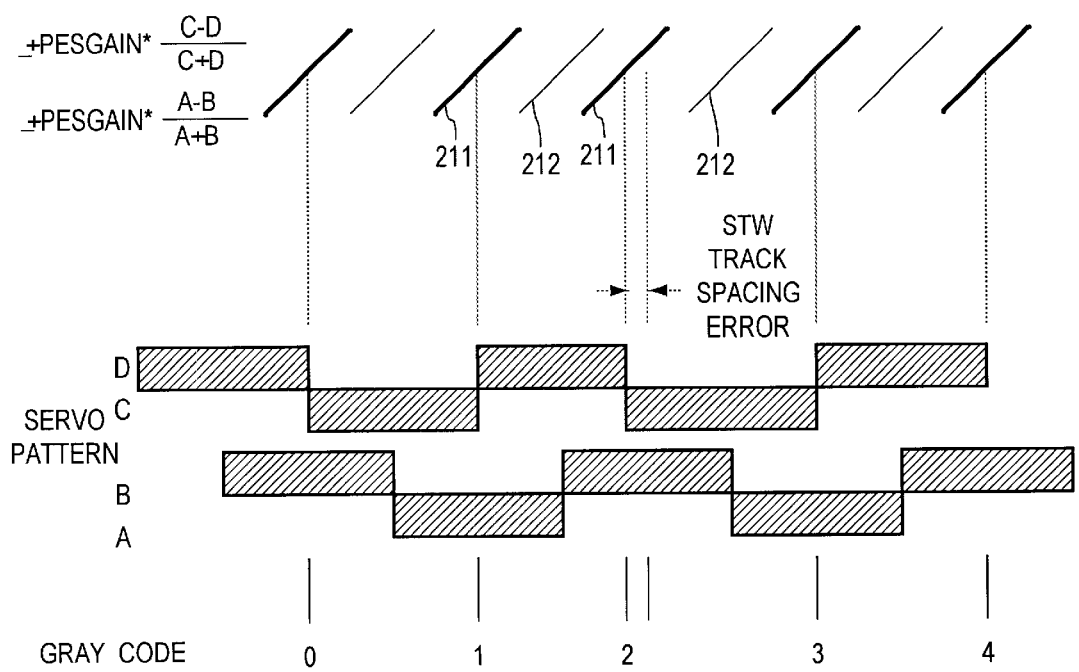
FIG. 8
PRIOR ART - WITH SPACING ERROR

P/Q SEGMENTS - NO SPACING ERROR

P/Q SEGMENTS - WITH SPACING ERROR

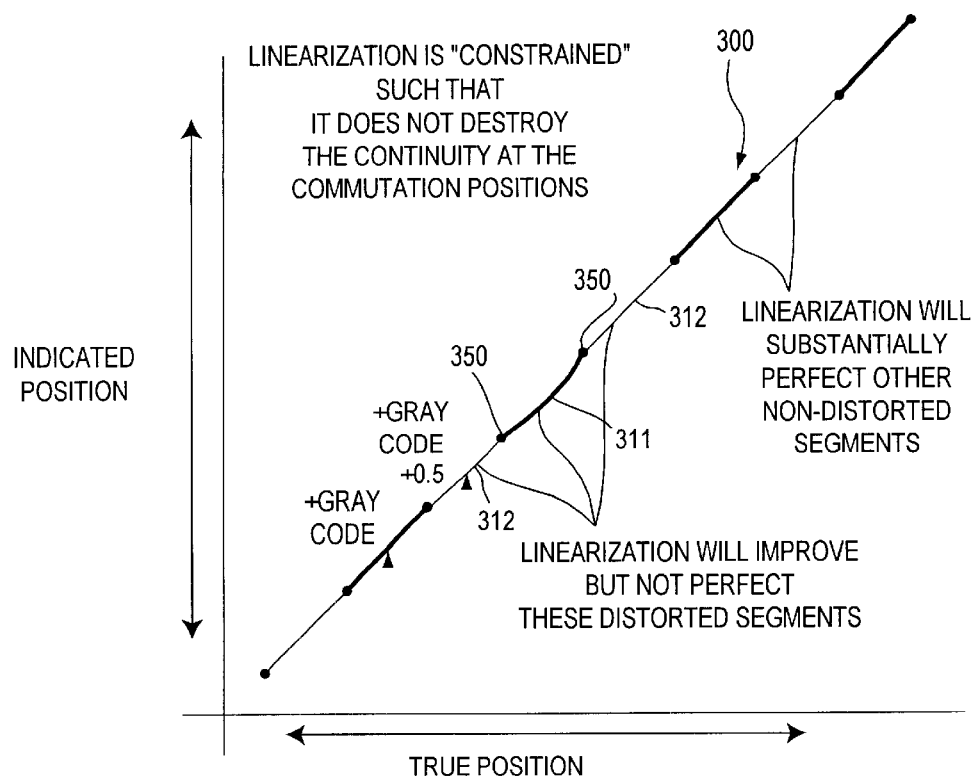
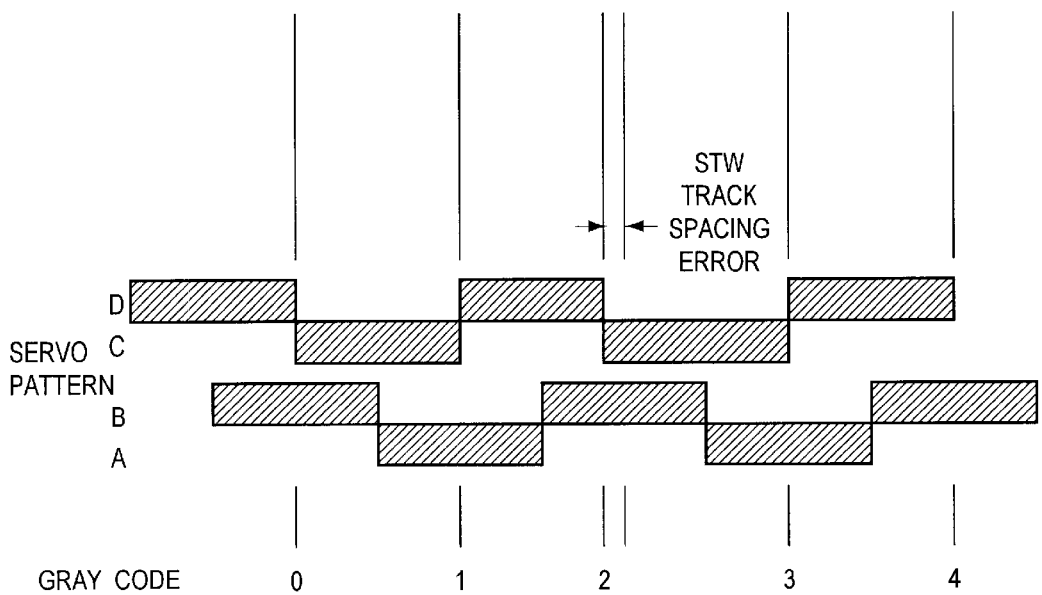
FIG. 13
P/Q SEGMENTS - AFTER CONSTRAINED LINEARIZATION $$\frac{pos}{inj} = G_{CL} = \frac{G_{OL}}{1+G_{OL}} \qquad G_{OL} = \frac{G_{CL}}{1-G_{Cl}} \qquad G_{OL} = \frac{pos}{error}$$

|   | (A-B) OFFSET FROM SEAM #1 | (C-D) OFFSET FROM SEAM #2 | (A-B) OFFSET FROM SEAM #3 | (C-D) OFFSET FROM SEAM #4 |
|---|---|---|---|---|
| 1 | -0.24 | -0.222 | -0.204 | -0.187 |
| 2 | -0.169 | -0.151 | -0.133 | -0.116 |
| 3 | -0.098 | -0.08 | -0.062 | -0.044 |
| 4 | -0.027 | -0.009 | 0.009 | 0.027 |
| 5 | 0.044 | 0.062 | 0.08 | 0.098 |
| 6 | 0.116 | 0.133 | 0.151 | 0.169 |
| 7 | 0.187 | 0.204 | 0.222 | 0.24 |

|   | (A-B) | (C-D) | (A-B) | (C-D) |
|---|---|---|---|---|
|   | OFFSET COMMAND FOR EACH LOCATION | | | |
| 1 | -4041 | -1214 | 1614 | 4442 |
| 2 | 3653 | -825 | 2002 | 4830 |
| 3 | -3265 | -437 | 2391 | 5219 |
| 4 | -2876 | -49 | 2779 | 5607 |
| 5 | -2488 | 340 | 3168 | 5995 |
| 6 | -2100 | 728 | 3556 | 6384 |
| 7 | -1711 | 1117 | 3944 | 6772 |

DISK DRIVE WITH METHOD OF CONSTRUCTING A CONTINUOUS POSITION SIGNAL AND CONSTRAINED METHOD OF LINEARIZING SUCH POSITION SIGNAL WHILE MAINTAINING CONTINUITY

BACKGROUND OF THE INVENTION

1. Field of the Invention

The invention relates generally to magnetic disk drives capable of constructing an indicated position signal from an integer track component and a fractional track component or fractional PES segment. The invention relates more particularly to a method of constructing an indicated position signal that is continuous from fractional PES segment to fractional PES segment and a related method of linearizing the fractional PES segments without destroying the continuity.

2. Description of the Related Art

A conventional disk drive has a head disk assembly ("HDA") including at least one disk ("disk"), a spindle motor for rapidly rotating the disk, and a head stack assembly ("HSA") that includes a head gimbal assembly (HGA) with a transducer head for reading and writing data. The HSA forms part of a servo control system that positions the transducer head over a particular track on the disk to read or write information from that track.

The industry presently prefers a "rotary" or "swing-type" actuator assembly which conventionally comprises an actuator body that rotates on a pivot assembly between limited positions, a coil that extends from one side of the actuator body to interact with a pair of permanent magnets to form a voice coil motor, and an actuator arm that extends from the opposite side of the actuator body to support the HGA.

Each surface of each disk conventionally contains a plurality of concentric data tracks angularly divided into a plurality of data sectors. In addition, special servo track information is provided on this disk or another disk to determine the position of the head. A manufacturing fixture called a servo track writer (STW) is used to write the servo track information on the surfaces of the disks in an HDA. The STW mechanically moves the actuator to a given reference position precisely measured by a laser interferometer. The HDA is then driven to write servo track information for that position. The process of precisely measured displacement and servo track writing is repeated to write all required servo tracks across the disk.

The most prevalent servo system used in disk drives is called "sampled servo" or "embedded servo" wherein the servo track information is written in a plurality of servo sectors that are equally angularly spaced from one another and interspersed between data segments around the track. Each servo sector comprises a track identification (ID) field defining a gray code track number or servo track number and a pattern of servo burst fields. The transducer head reads the track ID field and the servo bursts to construct an indicated position signal formed from an integer component and a fractional component. The gray code track number (track ID) provides the integer component and the servo bursts provide the fractional component. The difference between the indicated position and a desired position forms a position error signal (overall PES) for use by the servo control system. Note that overall PES is different than the fractional component which is often simply called the "PES." This application will refer to the latter as a "fractional component," "fractional PES," or "fractional PES segment" to avoid confusion.

The servo control system reads the track ID field and samples the servo bursts to position the transducer head at the desired radial position. The servo control system moves the transducer head toward a desired servo track during a coarse "seek" mode using the track ID field as a control input. Once the transducer head is generally over the desired servo track, the servo control system uses the servo bursts to keep the transducer head at a desired radial position relative to the servo track in a fine "track follow" mode.

One conventional servo burst pattern is a repeating pattern of four bursts, grouped as two burst pairs, where each pair is abutted along the "burst pair centerline" and wherein the pairs and associated burst pair centerlines are offset from one another by a fixed amount. The servo system constructs a fractional PES by computing a pair difference signal for each pair and choosing which pair difference signal to use based on which pair is closer.

The pair difference signal is zero if the head is positioned at a "seam" or burst pair centerline where a pair of bursts are abutted. The pair difference signal increases as the head moves away from the burst pair centerlines. In one conventional embodiment which makes efficient use of the STW, each burst is nominally one data track wide and the burst pair centerlines are spaced apart by one half of a data track. Because the read width of the head is less than a burst width, the servo system must switch or "commutate" between burst pairs when the head is at a "commutation position" near the mid-point between burst pair centerlines. Commonly, a fractional PES from a burst pair at track center is termed "P" or primary, while a fractional PES from the adjacent burst pair is termed "Q" or quadrature. In another embodiment used with narrower read heads such as magnetoresistive (MR) heads, the burst width may be two/thirds of a data track width and the burst pair centerlines are spaced apart by one/third of a data track width.

The indicated position signal should be continuous through the commutation position. An indicated position signal of ordinary construction, however, may have discontinuities owing to variations in the placement of the bursts during the servo writing process, non-linearity of the read head signals relative to true displacement from a burst pair centerline, or both. Discontinuities are especially prevalent with the current use of magnetoresistive (MR) heads, and are especially troublesome. First, MR heads have an inherently non-linear microtrack profile. Second, MR heads suffer from "head switch instability" in that when a head is selected, it may have undergone a state change which causes the head to exhibit a gain which is significantly shifted from its nominal value. Finally, to make matters worse, the servo system often operates with the head near the commutation position and in the vicinity of a potential discontinuity when "micro-jogging" (operating the head at an offset from a burst pair centerline) in one case to compensate for the offset between the read and write elements in an MR head.

The inventors are aware of MR head disk drives having servo control systems which provide some degree of hysteresis at the commutation position. Such disk drives tend to continue deriving the fractional PES from one burst pair centerline, or the other, even if the head moves a short distance to the other side of the commutation position. The hysteresis, therefore, reduces the likelihood of encountering a discontinuity while operating at the commutation position. Disk drives using hysteresis, however, continue to construct the fractional PES in a conventional manner such that a significant variance may still exist in the indicated position signal on either side of the commutation position. Accordingly, while hysteresis helps resolve the effect of discontinuities in the indicated position at the commutation position, it does nothing to prevent such variance in the first place and continues to allow for inherent instability while operating the MR head at or near the commutation position.

U.S. Pat. No. 5,825,579, assigned to IBM, is an example of others having tried to achieve a continuous PES at the commutation position. The IBM inventors, however, select one of four segments +P, +Q, −P, or −Q based on whether the head is over "track type" 0, 1, 2, or 3, and then "stitch" the segments together to form a position error signal (PES) portion of the overall position signal (fractional PES segment herein). Moreover, the IBM approach requires different algorithms for wide read heads (equation 5), narrow read heads (equations 6 and 7), and read heads with widths between these two extremes (function 11). The IBM approach is apparently head width dependent because it relies on linearizing the raw signal components rather than the overall position signal and its fractional PES segments.

There is a need therefore for an improved method of constructing an indicated position signal which is continuous through the commutation positions, is insensitive to head width and to discontinuities caused by servo burst variations which occur during the STW process, and impervious to gain variations caused by changes in MR head channel characteristics.

Finally, disk drives generally require some method of linearity compensation. This is particularly true of disk drives using MR heads. If such compensation is applied to the overall position signal, however, it must not destroy the continuity previously provided for at the commutation position. There is a further need, therefore, for a "constrained" method of linearity compensation which provides the desired compensation without modifying, or by equally modifying, the predetermined transition values determined from the burst pair centerlines on either side of the commutation position.

SUMMARY OF INVENTION

In one aspect, the present invention may be regarded as a method of determining an indicated position signal corresponding to a radial position of a read head over a rotating disk in a magnetic disk drive, the method implemented in a disk drive including a rotating disk and a read head for reading servo information from the rotating disk, the servo information including a servo pattern of four circumferentially successive, radially repeating servo bursts A,B,C,D that are arranged in quadrature to define an alternating plurality of AB and CD burst pair centerlines that are nominally spaced from one another by ½ servo track pitch units, the method comprising the steps of: reading four servo bursts A,B,C,D with the read head; determining whether the read head is closer to an AB burst pair centerline or to a CD burst pair centerline; and causing the fractional track PES value to equal ±¼ track pitch units at a commutation position midway between the AB and CD burst pair centerlines regardless of whether or not those centerlines are separated by ½ servo track pitch units by constructing a fractional PES value as $$P = -\frac{1}{4}\frac{(C-D)}{(A-B)}$$

when the read head is closer to the CD burst pair centerline within a first fractional PES segment and as $$P = +\frac{1}{4}\frac{(A-B)}{(C-D)}$$

when the read head is closer to the AB burst pair centerline within a second fractional PES segment the first and fraction PES segments continuously connected to one another at the commutation position to form an indicated position signal; and linearizing the fractional PES values within the fractional PES segments while keeping the fractional track PES values equal to one another at the commutation positions and keeping the indicated position signal continuous.

In a second aspect, the present invention may be regarded as a disk drive having a disk, a transducer, and an embedded servo control system including a servo sector having a first burst pair and a second burst pair disposed on the disk, a method of constructing a position signal reflecting a position of the transducer relative to the servo sector, the method comprising the steps of: obtaining a measured position p relative to a first burst pair centerline wherein the measured position p ranges within a first fractional PES segment from a first measured endpoint position $p_{START}$ on a first side of the first burst pair centerline to a second measured endpoint position $p_{END}$ on a second side of the first burst pair centerline, the first and second measured endpoint positions being equal in magnitude and opposite in sign such that the first fractional PES segment is continuous at a segment junction formed with a second fractional PES segment associated with a second burst pair centerline located adjacent to the first burst pair centerline; and deriving an estimated position $\hat{x}$ that more closely corresponds to a true position x by compensating for nonlinearities in the measured position p at positions with values in between the first and second measured endpoint positions, while keeping the first and second endpoint values equal in magnitude and opposite in sign to keep the first fractional PES segment continuous with the second fractional PES segment.

In a third aspect, the invention may be regarded as a disk drive having a disk, a transducer, and an embedded servo control system including a servo sector having a primary burst pair joined at a primary burst pair centerline and a quadrature burst pair joined at a quadrature burst pair centerline, wherein the servo control system derives a primary position signal waveform from the primary burst pair and a quadrature position signal waveform from the quadrature burst pair, wherein the servo control system provides fractional PES segments that are subject to discontinuity when they are joined at a commutation position to form an indicated position signal, a method for producing a discontinuity-corrected position signal from the fractional PES segments, the method comprising the steps of: determining whether the transducer is closer to the primary burst pair centerline or the quadrature burst pair centerline; and if the transducer is closer to the primary burst pair centerline, constructing a fractional PES value from a first ratio of the primary and quadrature position signal waveforms; else if the transducer is closer to the quadrature burst pair centerline, constructing the position signal from a second ratio of primary and quadrature position waveforms; and applying a linearity correction to the fractional PES value which is applied independently of a width of the transducer and regardless of whether the transducer is nearer either burst pair centerline or the commutation position; whereby the indicated position signal is continuous at the commutation position and substantially linear between the commutation position and an adjacent commutation position.

BRIEF DESCRIPTION OF THE DRAWINGS

The just summarized invention may best be understood with reference to the Figures of which:

FIG. 3 is a diagram of a conventional servo pattern wherein four servo bursts A, B, C and D of radial width W are arranged in quadrature;

FIG. 4 shows the burst amplitude profiles associated with the servo bursts A, B, C and D of FIG. 3 as a function of the radial position of a read transducer (not shown) passing over such servo bursts;

FIG. 5 shows conventional P and Q waveforms that are derived relative to a primary burst pair centerline as P=C–D or relative to a quadrature burst pair centerline as Q=A–B;

FIG. 6 shows how the P and Q waveforms of FIG. 5 may be selectively inverted, normalized by dividing, and scaled by multiplying to provide fractional PES segments.

FIG. 7 shows how the conventional fractional PES segments of FIG. 6 are combined with gray code values to produce an indicated position signal;

FIG. 8 shows how a conventional servo scheme produces an indicated position signal that is discontinuous at certain commutation positions when faced with an STW track spacing error;

FIG. 9 shows that two quotient values derived from the burst amplitudes of FIG. 4 as $$Q1 = \frac{C-D}{A-B} \text{ and } Q2 = \frac{A-B}{C-D}$$

Figure 2:
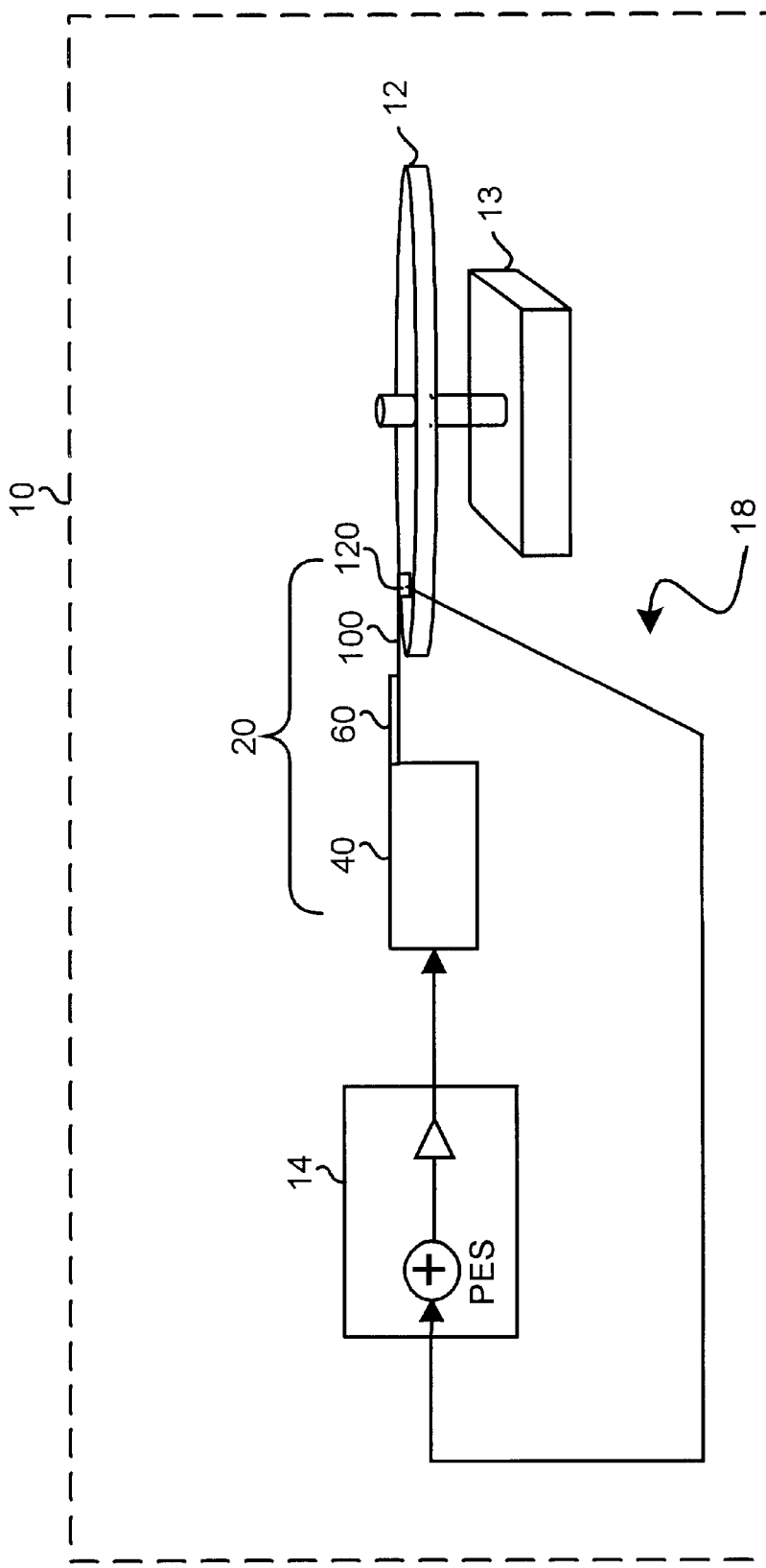
FIG. 2 is a schematic, block diagram of a servo control loop 18 used to position a transducer head 120 over a surface of a disk 12 in the disk drive 10 of FIG. 1.
Figure 11:
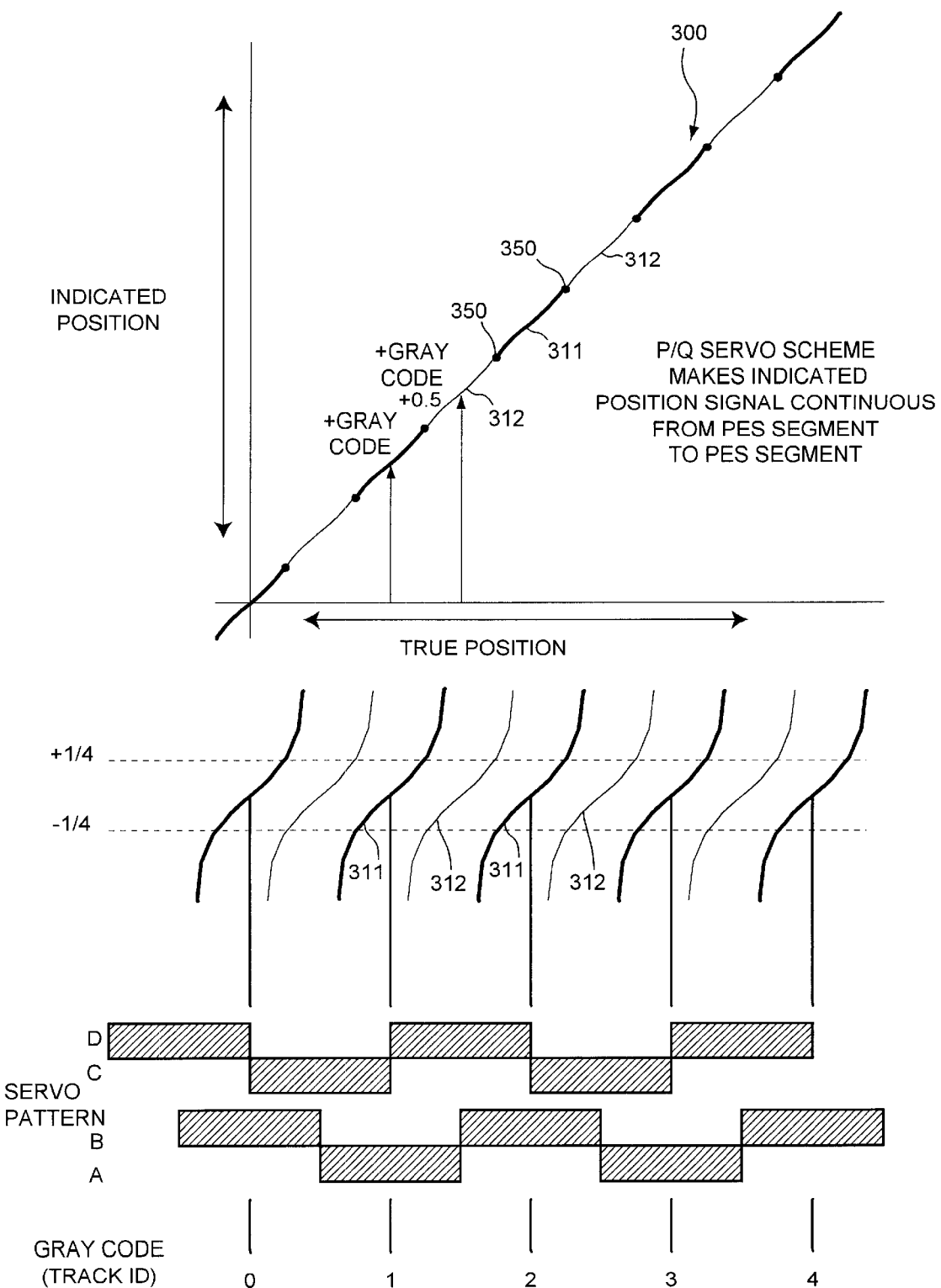
Figure 12:
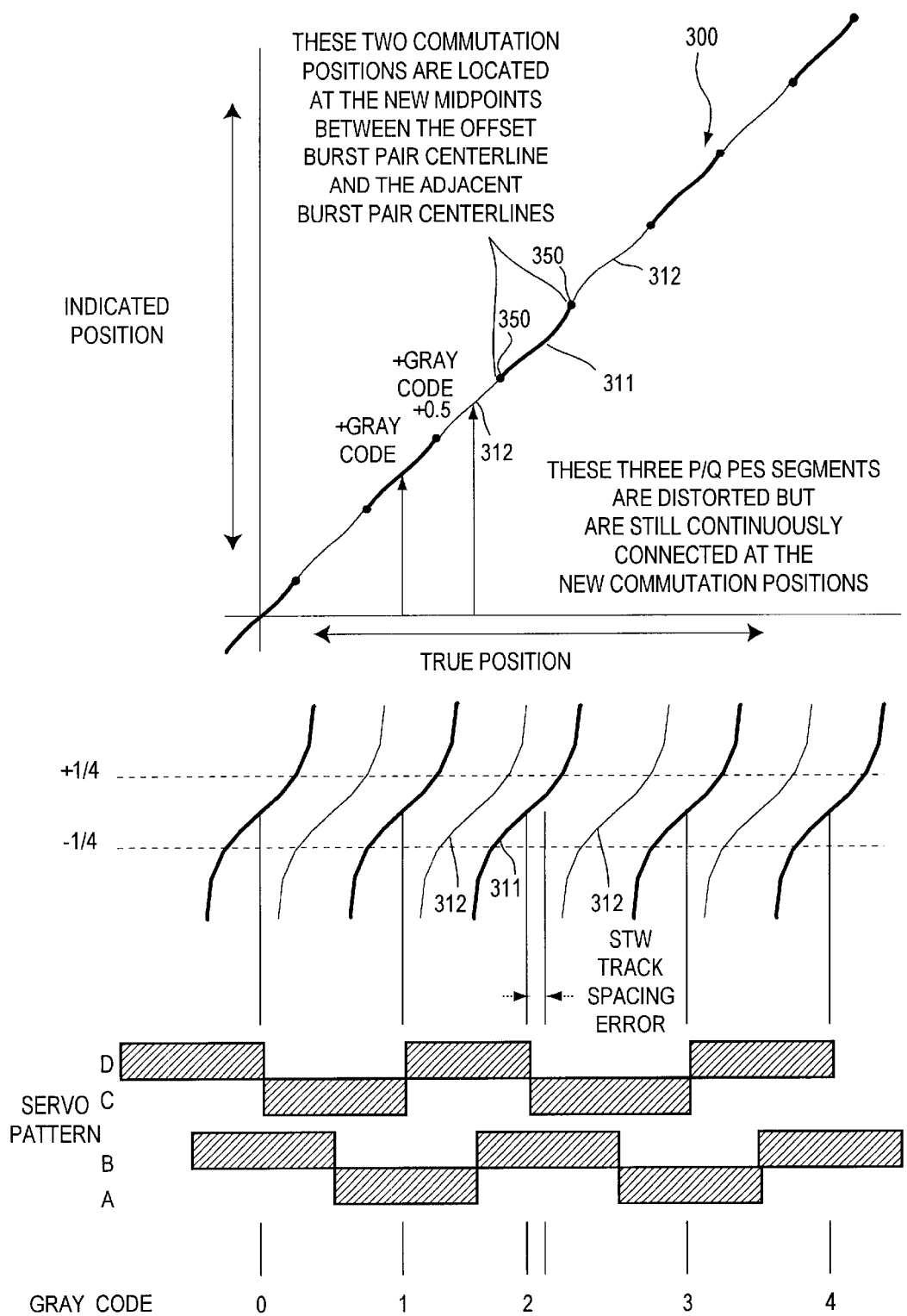
Figures 14, 15, 16:
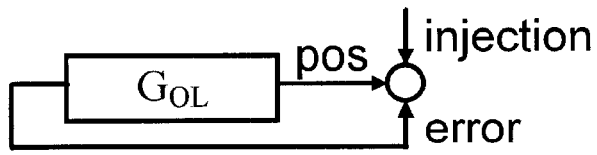
Figure 17:
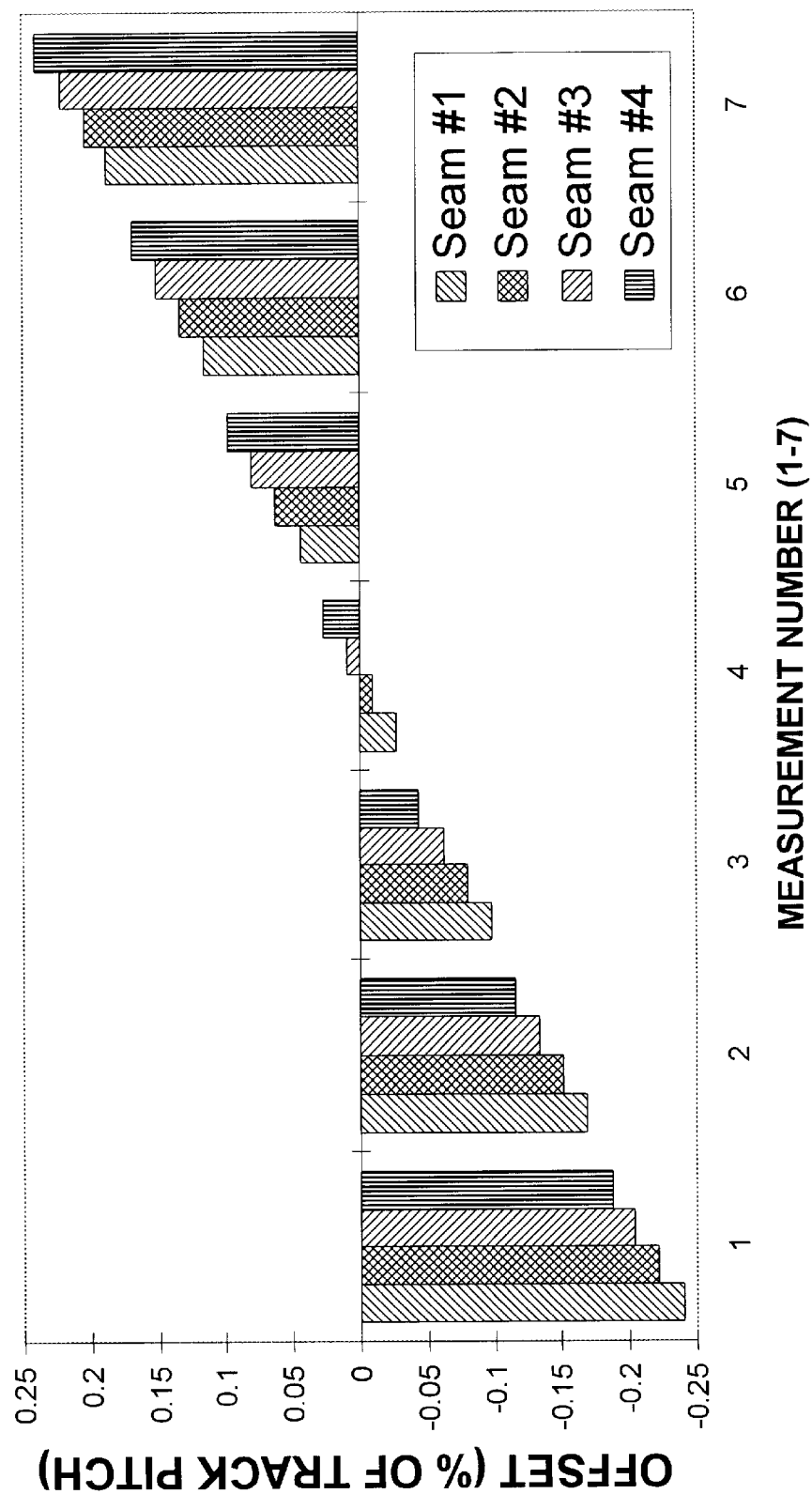

will inherently intersect one another at values of ±1 whenever the head is at a position where (A–B)=(C=D) or where(A–B)=–(C–D), i.e. whenever the head is at a commutation position located midway between and about ±¼ servo track pitch units from adjacent burst pair centerlines ("about" because the STW track spacing between adjacent burst pair centerlines may not exactly equal ½ servo track pitch units as shown in FIGS. 8 and 9 below);

FIG. 10 shows fractional PES segments constructed according to this invention wherein the fractional PES is calculated as either $$P = \frac{-1}{4}Q1 = \frac{-1}{4}\frac{(C-D)}{(A-B)} \text{ or } P = \frac{+1}{4}Q2 = \frac{+1}{4}\frac{(A-B)}{(C-D)}$$

such that the fractional PES segments have a common slope (positive or negative) and such that the fractional PES segments are mathematically constrained to equal ±¼ whenever the head is at a commutation position located midway between and about ±¼ servo track pitch units from adjacent burst pair centerlines;

FIG. 11 shows how the fractional PES segments of the present invention are combined with gray code values to produce an indicated position signal;

FIG. 12 shows how the present invention produces an indicated position signal that is continuous from PES segment to PES segment even in the face of an STW track spacing error;

FIG. 13 shows how the indicated position signal of FIG. 12 may be linearized without destroying the continuity from fractional PES segment to fractional PES segment;

FIG. 14 is a system level diagram of the servo control loop of FIG. 2 showing how the open loop gain for a particular frequency may be determined by injecting a small signal of known amplitude at that particular frequency;

FIG. 15 is a table specifying four sets of seven off-track locations that provide a well dispersed distribution of off-track positions that vary between –0.24 and +0.24 relative to four adjacent burst pair centerlines or servo "seams" that form the overall servo burst pattern;

FIG. 16 is a table specifying the offset command for corresponding off-track locations in the table of FIG. 15 and relative to an initial seek to Seam #2;

FIG. 17 shows how the twenty-eight off-track positions from the table of FIG. 16, measured relative to four adjacent servo seams, are distributed between approximately –0.24 and +0.24 when superimposed across one hypothetical servo seam;

BRIEF DESCRIPTION OF THE PREFERRED EMBODIMENTS

Figure 1:
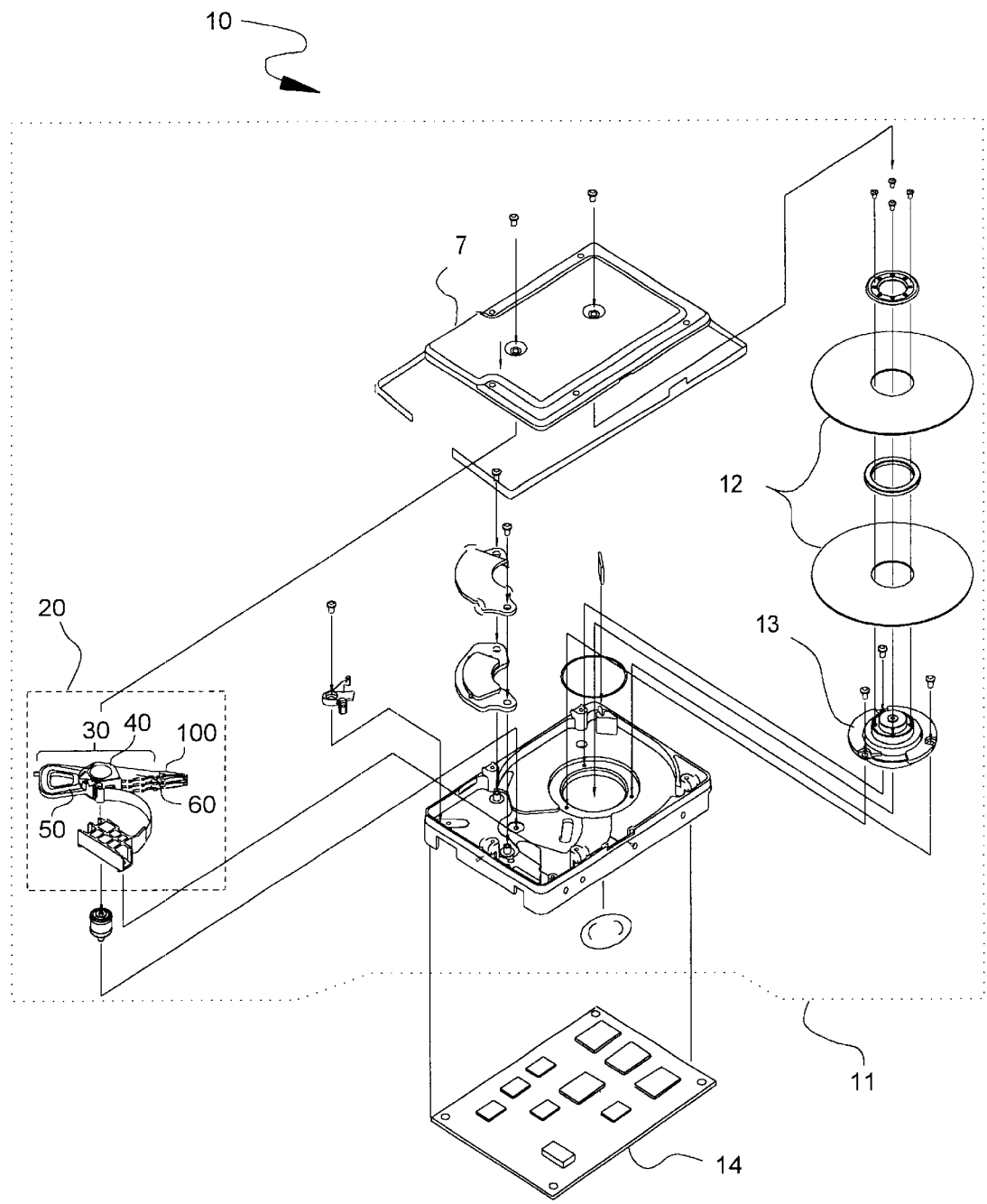
FIG. 1 is an exploded perspective view of a magnetic disk drive 10 having a head disk assembly 11 ("HDA") including a head stack assembly 20 ("HSA") which carries a magnetoresistive transducer over concentric data tracks, servo tracks and associated data tracks on the surface of a disk 12.

FIG. 1 shows the principal components of a disk drive 10 in which a position signal construction according to this invention may be implemented. The disk drive 10 comprises a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 comprises a swing-type actuator assembly 30 having a voice coil 50, an actuator body 40, and an actuator arm 60. At least one head gimbal assembly 100 extends from each actuator arm 60 and carries a transducer head 120 (see FIG. 2) over the disk 12.

The head stack assembly 20 is located so that the head 120 of the head gimbal assembly 100 is biased towards and moveable over the disk 12. The HDA's storage capacity may be increased, as shown in FIG. 1, by including several disks 12 and a head stack assembly 20 having a vertical "stack" of head gimbal assemblies 100 and associated heads 120 for each surface of each disk 12, the head gimbal assemblies 100 supported by multiple actuator arm 60.

FIG. 2 is a schematic, block diagram of a servo control loop 18 used to position a transducer head 120 over a surface of a disk 12 in the disk drive 10 of FIG. 1. As suggested therein, servo electronics within the controller circuit board 14 control the actuator 20 based on servo signals fed back from the transducer head 120. A detailed description of the servo control loop is unnecessary because its general operation is well known in the industry.

As explained above, a sampled servo or embedded servo system is presently popular. In such an arrangement, servo bursts are recorded in a circumferentially successive, radially offset fashion within a servo sector.

The simplest servo pattern (not shown) uses only two bursts per data track. The burst pair centerlines and data track centerlines are coincident in this arrangement. The two bursts are usually designated as the "A" burst and the "B" burst because they are circumferentially displaced from one another in terms of angular position such that the head passes over the A burst and then over the B burst. The A burst is radially displaced to one side of the servo track centerline and the B burst is displaced to the other side. In this case, the fractional PES is simply constructed as (A–B). If the read head is aligned with the burst pair centerline, then the read head will pass over equal amounts of the A and B bursts, and the servo electronics will develop a fractional PES equal to zero. If the head is displaced from the burst pair centerline, then the head will pass over more of the A burst or more of the B burst and the fractional PES will be nonzero, the sign of the fractional PES indicating the direction of displacement. The fractional PES is used by the servo electronics to help attain and then maintain a desired position.

I. Constructing the Position Signal

This invention is best understood comparing and contrasting it with a known method. The old and new methods will be discussed in connection with the same servo pattern. FIG. 3, in particular, shows a conventional servo pattern wherein four servo bursts A, B, C, D of radial width W are arranged in "quadrature." A quadrature pattern commonly used with MR heads is a ⅓, ⅓, ⅓ pattern wherein each of the servo bursts has a radial width W nominally corresponding to ⅔ of a data track pitch (i.e. W=⅔) such that a succession of burst pair centerlines are located at ⅓ data track positions. Another fairly common quadrature pattern is a "half track" pattern wherein each of the four servo bursts has a radial width W nominally corresponding to 100% of a data track pitch (i.e. W=1) such that a succession of burst pair centerlines are located at one-half data track positions. In the latter half track case, for example, an AB centerline is 50% of a data track pitch away from a CD centerline, which is 50% of a data track pitch away from an AB centerline, which is 50% of a data track pitch away from a CD centerline, and so on.

The indicated position signal usually comprises two components: (1) an integer component; and (2) a fractional component. The integer component is typically derived by reading a gray code field in a servo sector. The first servo track at the outer-most diameter of the disk, for example, may be servo track 0 and the servo track numbers may increase therefrom toward the inner diameter of the disk. The fractional component, however, is generally derived relative to a nearby burst pair centerline that is defined by two angularly successive servo bursts that are radially offset to either side of the centerline. The fractional component is usually added to the integer component, but other processing may take place based on the odd or even status of the gray code, the relative values of the servo bursts, or both.

A. The Conventional Method

The conventional method of constructing a position signal from a quadrature pattern of four servo bursts A, B, C, D starts by measuring the burst amplitudes of all four servo bursts A,B,C,D, as shown in FIG. 4, and then constructing primary and quadrature waveforms P=C−D or Q=A−B, as shown in FIG. 5.

The conventional method often further relies on the fact that (A+B)≅(C+D) to normalize P and Q as $$P = \frac{C-D}{C+D} \text{ and } Q = \frac{A-B}{A+B}$$

Note from FIG. 5 that both P and Q have alternating portions of positive and negative slope. As suggested by FIG. 6, therefore, the conventional firmware further constructs the fractional PES segments 211, 212 through the two-step process of:

1. selecting the smallest of the primary signal $$P = \frac{C-D}{C+D} \text{ or } Q = \frac{A-B}{A+B}$$

(i.e. the one associated with the closes burst pair centerline); and 2. determining whether the slope of the selected signal (P or Q) is positive or negative and multiplying the signal value by ±1.

As further suggested by FIG. 6, the fractional PES segments 211, 212 are scaled with a multiplier (e.g. pesgain) to provide for full scale resolution given variation in head sensitivity, and to provide for nominally (i.e. hopefully) equal fractional PES values at the commutation position between adjacent burst pair centerlines, i.e.

$$P = \text{pesgain} * \frac{C-D}{C+D}$$

$$Q = \text{pesgain} * \frac{A-B}{A+B}$$

One conventional approach to scaling takes the raw fractional PES values at the nominal +25% position where (A−B)=(C−D) and at the nominal −25% position where (A−B)=−(C−D), inverts one of the values and adds it to the other to produce a sum, and divides the presumed spacing (0.25)−(0.25)=0.50 by the sum to derive the pesgain for a particular head. The pesgain will only work correctly for centerline spacing that equals the presumed spacing. If the pesgain perfectly recorded each of the burst pair centerlines at exactly 50% of a servo track pitch apart, then the relationship between the fractional PES value and the true displacement will be accurate and the fractional PES will be reported as −25% when computed from the burst pair centerline on one side of the quarter track and as +25% when computed from the burst pair centerline on the other side of the quarter track. As shown in FIG. 7, the servo control system generates an indicated position signal 200 by adding the fractional PES segments 211, 212 to the gray code and, if necessary, by adding 0.5. In FIG. 12, the indicated position signal 200 is continuous because the STW track spacing is perfect. As shown in FIG. 8, however, there may be an STW track spacing error and the STW track spacing may vary from a little less to a little more than 50% of a servo track pitch from burst pair centerline to an adjacent centerline. Even after establishing the pesgain, therefore, the fractional PES value at a particular commutation position may be computed differently from the offset fractional PES segment 211 than from the adjacent fractional PES segments 212. This will insert discontinuities 231 into the overall position signal 200 at the commutation positions 250 (i.e. at the nominal quarter track points in a quadrature pattern). For example, the fractional PER may be discontinuously computed as −28% from one burst pair centerline and as +23% from the other burst pair centerline. This is extremely undesirable, of course, when jogging an MR head in the vicinity of the commutation positions 250.

B. The New Method

The new method of constructing a position signal will also be discussed with respect to the quadrature pattern of four servo bursts shown in FIG. 3, the associated burst amplitude profiles of FIG. 4, and the associated P and Q waveforms of FIG. 5.

The new method was developed from several key observations regarding the P and Q waveforms of FIG. 5. In particular, it can be seen that the P and Q waveforms of FIG. 5 look like sine waves that are 90° out of phase or, in other words, are similar in shape to sine($\pi$x) and cosine($\pi$x) where x is the head's location. This observation is especially true in the case of MR heads wherein the P and Q waveforms are less trapezoidal and more sinusoidal (not shown). In any event, if the P and Q waveforms were literally P=sine($\pi$x) and Q=cosine($\pi$x), then x could be found as $$x = \frac{1}{\pi}\arctan\left(\frac{\sin \pi x}{\cos \pi x}\right) = \frac{1}{\pi}\arctan\left(\frac{P}{Q}\right) = \frac{1}{\pi}\arctan\left(\frac{\frac{C-D}{C+D}}{\frac{A-B}{A+B}}\right)$$

Moreover, since (C+D)≅constant≅(A+B), the math may be simplified to $$x = \frac{1}{\pi}\arctan\left(\frac{C-D}{A-B}\right)$$

However, since the P and Q waveforms are not exactly sinewaves, x is not exactly a function of the arctangent of P/Q. Nonetheless, a new function of the same general form may be found that closely approximates the head's location x, i.e.

$$x = f\left(\frac{C-D}{A-B}\right)$$

FIG. 9 shows two "raw" quotients $$Q1 = \frac{(C-D)}{(A-B)} \text{ and } Q2 = \frac{(A-B)}{(C-D)}$$

of this general form. Note that the quotients Q1, Q2 inherently intersect one another at values of ±1 whenever the head is at a commutation position 350 located midway between adjacent burst pair centerlines AB, CD where (A−B) equals (C−D) or where (A−B) equals −(C−D). Significantly, this is true regardless of whether or not the STW recorded the burst pair centerlines AB, CD with perfect STW track spacing. Given a quadrature pattern, therefore, the quotients Q1, Q2 will always equal ±1 when the head is at a commutation position 350 located half way between adjacent, burst pair centerlines regardless of the STW track spacing between those centerlines. Given perfect spacing, the commutation position 350 is located at +25% from one centerline and at −25% from the other centerline. Given imperfect spacing, the commutation position 350 will deviate from ±25%, but it will occur at exactly +X % from one centerline and exactly at −X % from the other where X is approximately equal to 25%.

FIG. 10 builds on FIG. 9 and shows a presently preferred method of construction according to this invention wherein the PES segments 311, 312 are developed relative to nearby burst pair centerlines CD and AB as:

$$P = -\frac{1}{4}Q1 = -\frac{1}{4}\frac{(C-D)}{(A-B)}$$

or as $$P = +\frac{1}{4}Q2 = +\frac{1}{4}\frac{(A-B)}{(C-D)},$$

Since the read head is always near two adjacent PES segments 311 or 312, the preferred system chooses the closer of the two based on which difference is smaller.

The scaling factor ±¼ automatically calibrates the system in that the read transducer is always positioned exactly or very close to ±¼ servo track pitch units away from a burst pair centerline when located at a commutation position where (A−B)=(C−D) or (A−B)=−(C−D). The position is exactly ±¼ servo track pitch units with perfect STW track spacing and close to ±¼ servo track pitch units with imperfect STW track spacing.

FIG. 11 shows how the fractional PES segments 311, 312 are stitched together at the commutation positions 350 to form an indicated position signal 300. FIG. 11 assumes perfect STW track spacing.

In FIG. 12, by contrast, there is a significant STW track spacing error such that one fractional PES segment 311 is offset to the left from its optimal location. This method, however, still generates a continuous position signal 300 by distorting the fractional PES segment 311, and the surrounding segments 312, 312, such that they still "connect" together with equal end-point values of ±25% at the commutation positions 350. The overall position signal 300 will be continuous from fractional PES segment to fractional PES segment 311, 312, therefore, regardless of the STW track spacing and regardless of the read transducers actual or effective width.

The new method of constructing a position signal, therefore, differs from the old method in that it does not rely on perfect track spacing to locate the commutation positions ±25% from adjacent centerlines but rather mathematically defines each intermediate commutation position 350 as the positions where |(A−B)|=|(C−D)|, i.e. where (A−B)=(C−D) or (A−B)=−(C−D), based on the servo bursts as written. Thus, the commutation position is located at exactly one fourth of the nominal servo track pitch only if the STW track spacing is perfect (i.e. exactly equal to ½ servo track pitch). However, because this invention defines the intermediate commutation position based on the bursts as written, it creates an indicated position signal 300 that is continuous from fractional PES segment 311, 312 to fractional PES segment 311, 312, even when the STW track spacing is not perfect (ie, not exactly equal to ½ a servo track pitch). Moreover, this novel method of construction provides the same result regardless of the width of the read transducer. This method of construction, therefore, is not susceptible to problems commonly associated with MR heads.

The new method also differs from the old method in that it uniquely does not rely on a PES gain calibration coefficient. This provides robustness with respect to MR head instability which is a common, detrimental behavior of MR (and GMR) heads. One manifestation of this is due to the movement of domain walls in the MR stripe. If a magnetic domain sets up in a corner of the stripe, it can render that portion of the stripe insensitive. The result is the across (???cross???) track amplitude profile is different than if the domain were not there. If the fraction PES value is defined as $$P = \text{pesgain} * \frac{C-D}{C+D}$$

where the quantity pesgain is a calibration value that is based on the slope of the across (???cross???) track amplitude profile, as discussed above, then the amplitude profile will change due to the effect of head instability, and the calibration will be wrong.

On the other hand, if the fractional track PES is defined as $$P = +\frac{1}{4}\frac{(A-B)}{(C-D)},$$

there is no gain calibration coefficient pesgain and the indicated fraction track PES is substantially less sensitive to changes in the across (???cross???) track amplitude profile.

In summary, we achieve a number of benefits by using this novel technique to construct the fractional PES segments 311, 312 and overall position signal 300. In particular, we:

eliminate fractional PES gain calibration since it is always ±¼.

reduce repeatability variation in the open loop gain due to MR head instability.

smooth transitions in the indicated position signal when commutating from one fractional PES segment to the next.

simplify the fractional PES construction algorithm by eliminating the need to check and account for slope.

improve repeatable runout RRO since the fractional PES at the commutation position is the average of two seams.

Appendix A shows pseudocode that is suitable for constructing a continuous indicated position signal according to this invention. The operation of the code is evident and need not be described herein except to note the call to a lookup table for purposes of linearization as discussed below.

II. Linearity Compensation

The position signal 300 of FIGS. 11 and 12 is continuously connected at the commutation positions 350 and it is relatively consistent from fractional PES segment to fractional PES segment 311, 312. It is, however, not linear across any one fractional PES segment 311, 312. Accordingly, linearity compensation is still desirable. The linearization, however, should not destroy the continuity of the position signal 300.

A. Overview

Linearization of the fractional PES segments 311, 312 is desirable simply because they are far from straight lines to begin with owing to their $$\frac{A-B}{C-D}$$

construction. Moreover, a magnetoresistive read transducer generally has a nonlinear read profile. The underlying burst amplitude signals used to derive the measured displacement (fractional PES), therefore, do not themselves exhibit a linear relationship with real displacement as the read transducer is moved away from the null point. This is troublesome because the MR read head must often track follow away from the null position where the PES=0 under certain conditions. The first condition is the separation of the read and write transducers. A second possible condition is the use of a servo pattern with burst pair centerlines that are not aligned with data track centerlines. The curvy characteristics of the fractional PES 311, 312, the nonlinear response of the read transducer, and the frequent need to operate off center, therefore, make it desirable to calibrate the fractional PES segments 311, 312 as a function of true displacement in order to accurately position the MR head on either side of the null position within the segments.

This invention offers a method for developing linearity compensation coefficients corresponding to a mathematical function which, when presented with a measured position p (i.e. the fractional PES), produces an estimated position $\hat{x}$ that closely approximates a true position x. The servo firmware uses the coefficients to correct for errors in the measured position p that are caused, for example, by the read transducer's non-uniform read profile.

The linearity compensation essentially alters each measured position p to produce an estimated position $\hat{x}$. The entire first half of this invention, however, is directed to a method of constructing a position signal 300 having continuous values at the commutation positions 350 connecting adjacent fractional PES segments 311, 312. Consequently, the linearity compensation must be "constrained" as suggested by FIG. 13 so that it does not modify the purposeful continuity of the indicated signal 300 at the commutation positions 350.

FIG. 10 suggests another way to view this relationship. As suggested therein, the measured position p ranges within a fractional PES segments 311 or 312 from a first measured endpoint position $p_{START}$ on a first side of the burst pair centerline AB or CD to a second measured endpoint position $p_{END}$ on a second side of the burst pair centerline. The linearization may be viewed as ensuring that all of the first and second measured endpoint positions are equal in magnitude and opposite in sign such that a first fractional PES segment 311 is continuous at a commutation position or "segment junction" formed with a second fractional PES segments 312.

The constrained compensation method of this invention may be best understood with reference to the following sections.

B. Obtaining the Open Loop Gain Measurements

In order to compensate for any non-linearity in the measured position p as a function of true displacement x, we need to characterize such non-linearity. We cannot directly measure the non-linearity in the measured position p without an external reference, however, because the measured position p is used to control actuator location and not directly accessible and the true position x is unknown. The preferred calibration method operates without direct access to the measured position p and without any knowledge of true displacement x by injecting a particular frequency into the servo control system and measuring system's open loop gain $G(x_i)$ at each of a plurality of commanded positions $x_i$ relative to one or more burst pair centerlines. By measuring the open loop gain $G(x_i)$ of the servo control system as a function of track offset or measured position p, the shape of the non-linearity can be characterized and, therefore, corrected. The preferred system obtains M open loop gains $G(x_1)$ to $G(x_M)$ corresponding to M off-track positions $p_1$ to $p_M$. Before we get into the specifics, however, it is useful to review how we measure open loop gain.

FIG. 14 shows how we can determine the open loop gain of the read head 120 at a particular frequency by injecting a sine wave of that frequency and of known amplitude into the control loop 18. We arrive at the open loop gain of the read head 120 by measuring the closed loop gain of the entire control loop 18. Accordingly, the sine wave should be of small amplitude so that any variation in closed loop gain is due only to the non-uniform read profile of the read head 100, and not due to any other factors.

The preferred sine wave is 2% of a servo track pitch in amplitude and has a frequency of 540 Hz. As suggested by FIG. 14, we inject the sine wave into the control loop at the demod output and measure the 540 Hz content of the resulting position error. We chose 540 Hz because it is not a disk harmonic such that written-in content will not drown out the measurement (540 Hz is 4½ times the spindle frequency) and because 540 Hz is in a relatively flat part of the frequency response of the central loop so that gain is unlikely to change for reasons unrelated to linearity error in the head. Another frequency could work equally as well provided that there is sufficient measurement sensitivity at that frequency. From this error, the effective closed loop gain can be measured.

$$\frac{\text{pos}}{\text{inj}} = G_{CL} = \frac{G_{OL}}{1 + G_{OL}}$$

From the closed loop gain, the open loop gain can be calculated:

$$G_{OL} = \frac{G_{CL}}{1 - G_{Cl}} \text{ or } G_{OL} = \frac{\text{pos}}{\text{error}}$$

The linearity error should be about the same for equal deviations from each burst pair centerline. Accordingly, an average set of compensation values are developed for each read head by taking a plurality l of off-track gain measurements across n servo tracks at m locations on each surface, for a total of M measurements for each surface wherein M=n*m*l. It is preferable, in other words, to measure the open loop gain at a plurality l of off-track positions on either side of a plurality n*m of servo seams and process all of the data as if it were derived relative to a single "average" servo seam. The number of seams, the location of those seams on the disk, the number of off-track points, and the total number of measurements, is not critical and may vary from application to application depending on numerous factors.

There may be a servo pattern dependency, for example, due to the fact that different burst pair centerlines involves different burst pair edges or are otherwise slightly different. Accordingly, a single set of linearity compensation coefficients are preferably developed for a sequence of servo bursts that form the smallest repeating part of the servo pattern in question. In recording a quadrature pattern of the ⅓, ⅓, ⅓ variety, the half track variety, or any other variety, the STW records four servo tracks before the pattern repeats. Accordingly, when used with a quadrature servo pattern, the preferred system develops an average set of compensation values for each head using off-track gain measurements taken across a complete group of four servo tracks (n=4).

Additionally, to account for variations related to head skew and changes in response due to changes in linear bit density, the measurements are preferably made across multiple four track servo groups at, for example, five locations on each surface of each disk (m=5).

In the preferred embodiment, finally, gain is measured at seven off-track locations relative to each of the four adjacent servowritten tracks and without commutating to nearby servo tracks during such measurement in order to avoid any large changes in gain that are not related to the linearity of the head (l=7). If we perform a measurement process as just outlined, we develop a total of 140 measurement locations for each surface (M=n*m*l=4*5*7=140)

FIG. 15 is a table specifying the seven preferred off-track locations that are defined relative to four adjacent servo tracks. The off-track locations were selected in order to provide a well dispersed distribution of off-track positions relative to four successive burst pair centerlines which, when combined, interlace to vary between −0.24 and +0.24. This is perhaps best illustrated by FIG. 17 which shows how the twenty-eight off-track positions from the table of FIG. 15, measured relative to four adjacent servo seams, are distributed between approximately −0.24 and +0.24 when superimposed across one hypothetical servo seam.

In this particular embodiment, the gain curve rolls off as the head is positioned farther from the servo track center. As the gain drops, measurement error increases. This is particularly noteworthy because, as noted above, we do not permit commutation to a nearby burst pair centerline. The system is measuring gain by injecting a 2% sine wave at a frequency where the gain is greater than 1. Accordingly, the head nominally positioned at ±0.25 servo tracks is moving as far out as about ±0.27 servo tracks. Without commutation, the servo control system will lose control somewhere between about 0.30 and 0.50. The inventor chose to gather gain values between ±0.24 servo tracks in order to maintain stability and measurement SNR but, the present invention provides linearity compensation coefficients that permit later extrapolation to off-track positions of +0.25 servo tracks and beyond.

FIG. 16 is a table specifying the twenty-eight offset commands corresponding to the twenty-eight off-track locations in the table of FIG. 15. These offset commands assume the servo bursts are ⅔ of a data track wide (i.e. W=⅔) and that there are 8192 counts per data track and such that one servo track=5461.33 counts (8192×⅔=5461.33). The offset commands are given relative to an initial seek to Seam #2. This can be confirmed by a careful review of the table of FIG. 16, going from top to bottom and left to right in each column.

C. Deriving the Compensation Coefficients

If the measured position is p when the true position is x, then we ideally want p=x for all true positions x. Since p is not a linear function of x, however, we resort to an estimated position $\hat{x}$ that is an accurate estimate of the true position x, i.e.:

$$\hat{x} \approx x \quad (1)$$

We start only with the measured position p. We can get the estimated position $\hat{x}$ from the measured position p using an estimation function c(p), i.e.

$$\hat{x} \approx c(p) \approx x \quad (2)$$

Since it is operationally convenient to add a value to or subtract a value from a measured position p, the estimation function c(p) which provides the estimated position $\hat{x}$ may be regarded as the sum of the measured position p plus a correction function h(p), i.e.

$$c(p) = p + h(p) \quad (2)$$

In addition to wanting the estimated position $\hat{x} \approx x$ for each true position x, we also want unitary gain. In other words, we want the estimated position $\hat{x} = c(p)$ to change uniformly with changes in the true position x in order to compensate for any gain variation injected by the read head, i.e. we want the overall estimation function c(p) to satisfy the following differential condition:

$$\frac{\partial \hat{x}}{\partial x} = \frac{\partial c(p)}{\partial x} = 1 \quad (3)$$

Equation (3) defines our desired unitary gain condition. We can use the "chain rule" to rewrite equation (3) as a partial derivative with respect to the measured position p as follows:

$$\frac{\partial c(p)}{\partial x} = \frac{\partial c(p)}{\partial p}\frac{\partial p}{\partial x} = \frac{\partial c(p)}{\partial p}g(x) = \frac{sf \partial c(p)}{\partial p}\frac{g(x)}{sf} \quad (4)$$

$$= \frac{sf \partial c(p)}{\partial p} G(x) = 1$$

where $$g(x) = \frac{\partial p}{\partial x}$$

is the instantaneous rate of change in measured position p with respect to true position x, i.e. the PES gain vs. off-track. We cannot directly measure the PES gain $$g(x) = \frac{\partial p}{\partial x},$$

but we can measure the open loop gain G(x) which is proportional to the PES gain g(x) over the small distances across each servo track, i.e.

$$G(x) = \frac{g(x)}{sf}$$

where sf is a "scale factor" or proportionality constant that accounts for system gains in the control loop and relates the open loop gain G(x) to the closed loop gain g(x).

In equation (2), we defined c(p)=p+h(p). Substituting equation (2) into equation (4), therefore, we have $$\frac{sf\partial c(p)}{\partial p} G(x) = \frac{sf\partial[p+h(p)]}{\partial p} G(x) \qquad (5)$$

$$= \frac{\partial[sfp+sfh(p)]}{\partial p} G(x)$$

$$= 1$$

We now turn to the correction function h(p). The presently preferred correction function h(p) is approximated with a truncated Fourier series over a range of interest for the measured position p, i.e.

$$h(p) = \sum_{n=1}^{N} a_n \sin(n\omega p) + \sum_{n=1}^{N} b_n \cos(n\omega p) \qquad (6)$$

where $\omega=2\pi$ and $$p \in \left[-\frac{1}{4}, +\frac{1}{4}\right]$$

data tracks.

In an equivalent but more fully expanded form, the correction function h(p) may be regarded as:

$$h(p)=a_1 \sin(\omega p)+b_1 \cos(\omega p)+a_2 \sin(2\omega p)+b_2 \cos(2\omega p) \ldots +a_N \sin(N\omega p)+b_N \cos(N\omega p) \qquad (7)$$

where $\omega=2\pi$ and $$p \in \left[-\frac{1}{4}, +\frac{1}{4}\right].$$

If we introduce the truncated Fourier series approximation of the correction function h(p) of equation (6) into equation (5), we have:

$$\frac{\partial\left[sfp + sf\left(\sum_{n=1}^{N} a_n\sin(n\omega p) + \sum_{n=1}^{N} b_n\cos(n\omega p)\right)\right]}{\partial p} G(x) = 1 \qquad (8)$$

Next, by differentiating equation (8) as a function of the measured position p, we have:

$$\left[sf + \sum_{n=1}^{N} n\omega sfa_n\cos(n\omega p) - \sum_{n=1}^{N} n\omega sfb_n\sin(n\omega p)\right]G(x) = 1 \qquad (9)$$

If the correction function h(p) is represented as a truncated Fourier series having N Fourier harmonics and if we make M gain measurements at M actuator locations $x_1$ to $x_M$, then we obtain M measured or "demodulated" positions $p_1$ to $p_M$ and M open loop gain values $G(x_1)$ to $G(x_M)$. We can represent all of these values in a simultaneous system of M equations from appropriate substitution into equation (9), as follows:

$$\left[sf + \sum_{n=1}^{N} n\omega sfa_n\cos(n\omega p_1) - \sum_{n=1}^{N} n\omega sfb_n\sin(n\omega p_1)\right]G(x_1) = 1$$

$$\left[sf + \sum_{n=1}^{N} n\omega sfa_n\cos(n\omega p_2) - \sum_{n=1}^{N} n\omega sfb_n\sin(n\omega p_2)\right]G(x_2) = 1$$

$$\vdots$$

$$\left[sf + \sum_{n=1}^{N} n\omega sfa_n\cos(n\omega p_M) - \sum_{n=1}^{N} n\omega sfb_n\sin(n\omega p_M)\right]G(x_M) = 1$$

The foregoing system of M linear equations is equivalent to the matrix equation:

$$A_d * Comp = F \qquad (10)$$

where $A_d$ is a "demodulator" matrix of order M by (2N+1), Comp is a parameter vector of compensation coefficients, and F is a gain measurement vector, as follows:

$$A_d = \begin{bmatrix} 1 & -\omega\sin(\omega_{p_1}) & \omega\cos(\omega_{p_1}) & \cdots & -N\omega\sin(N\omega_{p_1}) & N\omega\cos(N\omega_{p_1}) \\ \vdots & & & \ddots & & \vdots \\ 1 & -\omega\sin(\omega_{p_M}) & \omega\cos(\omega_{p_M}) & \cdots & -N\omega\sin(N\omega_{p_M}) & N\omega\cos(N\omega_{p_M}) \end{bmatrix} \qquad (11)$$

$$Comp = sf * \begin{bmatrix} 1 \\ b_1 \\ a_1 \\ \vdots \\ b_N \\ a_N \end{bmatrix} \text{ and} \qquad (12)$$

$$F = \begin{bmatrix} 1/G(x_1) \\ 1/G(x_2) \\ \vdots \\ 1/G(x_M) \end{bmatrix} \qquad (13)$$

We could now obtain a plurality of open loop gains $G(x_1)$ and corresponding measured positions $p_i$ and then apply a least square optimization routine to solve for the 2N Fourier coefficients $a_1, b_1, a_2, b_2, \ldots a_N, b_N$ and for the scale factor sf. If we obtained the coefficients at this point, however, we will not maintain a smooth, continuous transition from one PES segment to the next.

C.1 Preferred Constraints

Recall that we went to great effort to make the measured position p equal to $\pm¼$ at the commutation position. Even after linearization, therefore, we want the estimated position $\hat{x} = c(p)$ to continue to equal $\pm¼$ when the measured position p is equal to $\pm¼$. Stated another way, we want to "constrain" the estimated position $\hat{x} = c(p)$ such that;

$$c\left(-\frac{1}{4}\right) = -\frac{1}{4} \text{ and} \qquad (14A)$$

$$c\left(+\frac{1}{4}\right) = +\frac{1}{4} \qquad (14B)$$

From equation (2) which defines the estimated position $\hat{x}$ as a function of the measured position p and a correction function h(p), i.e. $c(p) = p + h(p)$, we can rewrite the constraining equations (14A) and (14B) in terms of the correction function h(p) as:

$$-\frac{1}{4} + h\left(-\frac{1}{4}\right) = -\frac{1}{4} \qquad (15A)$$

$$+\frac{1}{4} + h\left(+\frac{1}{4}\right) = +\frac{1}{4} \qquad (15B)$$

or, after simplification, as:

$$h\left(-\frac{1}{4}\right) = 0 \qquad (16A)$$

$$h\left(+\frac{1}{4}\right) = 0 \qquad (16B)$$

If we further define a constraint matrix Constraint as follows:

$$\text{Constraint} = \begin{bmatrix} 0 & \cos(\omega/4) & \sin(\omega/4) & \cdots & \cos(N\omega/4) & \sin(N\omega/4) \\ 0 & \cos(-\omega/4) & \sin(-\omega/4) & \cdots & \cos(-N\omega/4) & \sin(-N\omega/4)) \end{bmatrix} \qquad (17)$$

then the problem of equation (10), as constrained by equations (14A) and (14B), can be restated in matrix notation as:

$$\underset{Comp}{\text{Min}}(F - A_d * Comp)' * (F - A_d * Comp) \text{ such that} \qquad (18)$$

Constraint*Comp=c where $$c = \begin{bmatrix} 0 \\ 0 \end{bmatrix}$$

and the prime sign stands for transpose.

C.2 Alternative Constraints

Other constraints may be employed. It may be desired, for example, to make sure no corrections are made while we are on track in addition to preserving continuity at the commutation positions. To implement these twin goals, we must satisfy the following conditions: (1) we must make c(0)=0 to eliminate any correction while track following on the burst pair centerline; and (2) we must make $$h\left(\frac{-1}{4}\right) = h\left(\frac{1}{4}\right).$$

to get smooth transitions going from one quarter track to the next.

Incorporating the first constraint (i.e. c(0)=0 ) implies modifying h(p) to:

$$h(p) = \sum_{n=1}^{N} a_n \sin(n\omega p) + \sum_{n=1}^{N} b_n \cos(n\omega p) - \sum_{n=1}^{N} b_n.$$

That is, the new modified h(p) is the compensation that should be added to the measured position p to get an estimate of the actual position x instead of equation (6).

On the other hand, recalling that $\omega=2\pi$, the second constraint implies:

$$h\left(\frac{-1}{4}\right) = h\left(\frac{1}{4}\right) \Leftrightarrow \sum_{n=1}^{N} a_n \sin\left(\frac{n\omega}{4}\right) = \sum_{\substack{n=1 \\ \forall odd\, n}}^{N} (-1)^{\frac{n-1}{2}} a_n = 0.$$

$$sf[1+\omega a_1 \cos(\omega p_4)-\omega b_1 \sin(\omega p_4)+2\omega a_2 \cos(2\omega p_4)-2\omega b_2 \sin(2\omega p_4)]=1/G(x_4)$$

$$sf[1+\omega a_1 \cos(\omega p_5)-\omega b_1 \sin(\omega p_5)+2\omega a_2 \cos(2\omega p_5)-2\omega b_2 \sin(2\omega p_5)]=1/G(x_5) \quad (21.1 \text{ to } 21.5)$$

or, in matrix notation, we have $A_d * \text{Comp} = F$:

$$\begin{bmatrix} 1 & \omega\cos(\omega p_1) & -\omega\sin(\omega p_1) & 2\omega\cos(2\omega p_1) & -2\omega\sin(2\omega p_1) \\ 1 & \omega\cos(\omega p_2) & -\omega\sin(\omega p_2) & 2\omega\cos(2\omega p_2) & -2\omega\sin(2\omega p_2) \\ 1 & \omega\cos(\omega p_3) & -\omega\sin(\omega p_3) & 2\omega\cos(2\omega p_3) & -2\omega\sin(2\omega p_3) \\ 1 & \omega\cos(\omega p_4) & -\omega\sin(\omega p_4) & 2\omega\cos(2\omega p_4) & -2\omega\sin(2\omega p_4) \\ 1 & \omega\cos(\omega p_5) & -\omega\sin(\omega p_5) & 2\omega\cos(2\omega p_5) & -2\omega\sin(2\omega p_5) \end{bmatrix} * sf * \begin{bmatrix} 1 \\ a_1 \\ b_1 \\ a_2 \\ b_2 \end{bmatrix} = \begin{bmatrix} \frac{1}{G(x_1)} \\ \frac{1}{G(x_2)} \\ \frac{1}{G(x_3)} \\ \frac{1}{G(x_4)} \\ \frac{1}{G(x_5)} \end{bmatrix}$$

$$A_d * \text{Comp} = F$$

D. Simple Example of the Defining Mathematics
D.1 The Unconstrained Least Squares Problem A simple example may be helpful. If we approximate the correction function h(p) with a truncated Fourier series having only two Fourier harmonics (N=2), then equation (9) becomes:

$$\left[sf + \sum_{n=1}^{2} n\omega sf a_n \cos(n\omega p) - \sum_{n=1}^{2} n\omega sf b_n \sin(n\omega p)\right] G(x) = 1 \quad (19)$$

or equivalently:

$$[sf+\omega sf a_1 \cos(\omega p)-\omega sf b_1 \sin(\omega p)+2\omega sf a_2 \cos(2\omega p)-2\omega sf b_2 \sin(2\omega p)]G(x)=1 \quad (20)$$

If we make five measurements (M=5), then we obtain five measured positions $p_1$ to $p_5$ and five open loop gain values $G(x_1)$ to $G(x_5)$ corresponding to five true positions $x_1$ to $x_5$ which, by simple substitution into equation (20) above, collectively define the following system of five simultaneous equations:

$$[sf+\omega sf a_1 \cos(\omega p_1)-\omega sf b_1 \sin(\omega p_1)+2\omega sf a_1 \cos(2\omega p_1)-2\omega sf b_2 \sin(2\omega p_1)]G(x_1)=1$$

$$[sf+\omega sf a_2 \cos(\omega p_2)-\omega sf b_2 \sin(\omega p_2)+2\omega sf a_2 \cos(2\omega p_2)-2\omega sf b_2 \sin(2\omega p_2)]G(x_2)=1$$

$$[sf+\omega sf a_3 \cos(\omega p_3)-\omega sf b_3 \sin(\omega p_3)+2\omega sf a_3 \cos(2\omega p_3)-2\omega sf b_3 \sin(2\omega p_3)]G(x_3)=1$$

$$[sf+\omega sf a_4 \cos(\omega p_4)-\omega sf b_4 \sin(\omega p_4)+2\omega sf a_4 \cos(2\omega p_4)-2\omega sf b_4 \sin(2\omega p_4)]G(x_4)=1$$

$$[sf+\omega sf a_5 \cos(\omega p_5)-\omega sf b_5 \sin(\omega p_5)+2\omega sf a_5 \cos(2\omega p_5)-2\omega sf b_5 \sin(2\omega p_5)]G(x_5)=1 \quad (20.1 \text{ to } 20.5)$$

By algebraically reorganizing equations 20.1 to 20.5, we have the following equivalent system:

$$sf[1+\omega a_1 \cos(\omega p_1)-\omega b_1 \sin(\omega p_1)+2\omega a_2 \cos(2\omega p_1)-2\omega b_2 \sin(2\omega p_1)]=1/G(x_1)$$

$$sf[1+\omega a_1 \cos(\omega p_2)-\omega b_1 \sin(\omega p_2)+2\omega a_2 \cos(2\omega p_2)-2\omega b_2 \sin(2\omega p_2)]=1/G(x_2)$$

$$sf[1+\omega a_1 \cos(\omega p_3)-\omega b_1 \sin(\omega p_3)+2\omega a_2 \cos(2\omega p_3)-2\omega b_2 \sin(2\omega p_3)]=1/G(x_3)$$

From here, we could find the four compensation coefficients $a_1, b_1, a_2, b_2$ that best fit the five equations (21.1 to 21.5) in an unconstrained, least square sense. The application of linearity coefficients found in this unconstrained manner, however, would detrimentally vary the value of the estimated position $\hat{x}$ at the commutation positions 350 connecting the fractional PES segments 311, 312 such that the fractional PES is not guaranteed to be continuous from fractional PES segment to fractional PES segment.

D.2 The Constraint Requirement

Recall from equations (16A and 16B) that we want to constrain the value of the correction function h(p) to two particular values (0 and 0) at two particular locations ($-\frac{1}{4}$ and $+\frac{1}{4}$), i.e. we want:

$$h\left(-\frac{1}{4}\right) = 0 \quad (16A)$$

$$h\left(+\frac{1}{4}\right) = 0 \quad (16B)$$

Referring to the correction function h(p) as defined in equation (6), we can derive the following equation where N=2:

$$h(p)=a_1 \sin(\omega p)+b_1 \cos(\omega p)+a_2 \sin(2\omega p)+b_2 \cos(2\omega p) \quad (22)$$

Applying our dual constraint equations (16A and 16B) to equation (22) results in the following system of two equations for the two measured positions of $p=+\frac{1}{4}$ and $p=-\frac{1}{4}$:

$$a_1 \sin\left(\omega\left[+\frac{1}{4}\right]\right) + b_1 \cos\left(\omega\left[+\frac{1}{4}\right]\right) + \quad (23)$$
$$a_2 \sin\left(2\omega\left[+\frac{1}{4}\right]\right) + b_2 \cos\left(2\omega\left[+\frac{1}{4}\right]\right) = 0$$

$$a_1 \sin\left(\omega\left[-\frac{1}{4}\right]\right) + b_1 \cos\left(\omega\left[-\frac{1}{4}\right]\right) +$$

-continued $$a_2 \sin\left(2\omega\left[-\frac{1}{4}\right]\right) + b_2 \cos\left(2\omega\left[-\frac{1}{4}\right]\right) = 0$$

By algebraically reorganizing equations (23), we have the following equivalent system of equations:

$a_1 \sin(\omega/4) + b_1 \cos(\omega/4) + a_2 \sin(2\omega/4) + b_2 \sin(2\omega/4) = 0$ $a_1 \sin(\omega/4) + b_1 \cos(-\omega/4) + a_2 \sin(-2\omega/4) + b_2 \cos(-2\omega/4) = 0$ (24)

or, in matrix notation, we can recast the problem to have Const*Comp=c:

$$\begin{bmatrix} 0 & \sin(+\omega/4) & \cos(+\omega/4) & \sin(+2\omega/4) & \cos(+2\omega/4) \\ 0 & \sin(-\omega/4) & \cos(-\omega/4) & \sin(-2\omega/4) & \cos(-2\omega/4) \end{bmatrix} * sf * \begin{bmatrix} 1 \\ b_1 \\ a_1 \\ b_2 \\ a_2 \end{bmatrix} = \begin{bmatrix} 0 \\ 0 \end{bmatrix}$$

$Const * Comp = c$

D.2 Constraining the Least Squares Solution

The four compensation coefficients $a_1, b_1, a_2, b_2$ are contained in the matrix Comp. In our simple example, we want to find the four compensation coefficients $a_1, b_1, a_2, b_2$ that best fit the five equations (20.1 to 20.5) in the least square sense and which are contained in the domain of coefficient values that satisfy two constraining equations (16A and 16B). The preferred process of doing so is explained in the next section.

E. Constrained Optimization of the Coefficients

The constrained optimization problem of equation (18) can be solved in the following way. First, we define a new (unconstrained) cost function, J(Comp), as:

$$J(Comp) = \frac{1}{2}*(F - A_d*Comp)'*(F - A_d*Comp) + \lambda'*(c - Const*Comp) \quad (25)$$

where $\lambda$ (a 2×1 vector) is the Lagrange multiplier. The scaling of ½ is used to simplify the algebra and will not affect the optimization results. Now, the unconstrained cost function, J(Comp), can be easily optimized over the compensation parameter matrix, Comp, by taking the derivative of J with respect to Comp and equating the result to zero, i.e.

$$\frac{\partial}{\partial Comp} J = A'_d * A_d * Comp - A'_d * F - Const' * \lambda = 0 \quad (26)$$

After carrying out all the algebra, we find a constrained least square version of Comp that may conveniently be called Comp_cls:

$$Comp\_cls = (A'_d*A_d)^{-1}*(A'_d*F + Const'*\lambda) \quad (27)$$

We can now combine the constraining criteria of equation (15) with equation (18) and solve for $\lambda$, i.e.:

$Const*Comp\_cls = c$ $Const*[(A'_d*A_d)^{-1}*(A'_d*F + Const'*\lambda)] = c$ $Const*[(A'_d*A_d)^{-1}*A'_d*F + (A'_d*A_d)^{-1}*Const'*\lambda] = c$ $Const*(A'_d*Ad)^{-1}A'_d*F + Const*(A'_d*A_d)^{-1}*Const'*\lambda = c$ (28)

$\therefore \lambda = [Const*(A'_d*A_d)^{-1}*Const']^{-1}*(c - Const*(A'_d*A_d)^{-1}*A'_d*F)$ (29)

The corresponding solution for the constrained least squares $$\left(\text{substituting } c = \begin{bmatrix} 0 \\ 0 \end{bmatrix}\right)$$

is:

$$Comp\_cls = A_{cls}*F \quad (30)$$

where $A_{cls}$ is a constrained least square matrix given by the following equation:

$$A_{cls} = [I - (A'_d*A_d)^{-1}*Const'*(Const*(A'_d*A_d)^{-1}* \quad (31)$$
$$Const')^{-1}*Const']*(A'_d*A_d)^{-1}*A'_d$$

where I is an identify matrix of order (2N+1×2N+1) and $A_{cls}$ is a matrix of order (2N+1×M). Note that $A_{cls}$ can be pre-calculated since it is only a function of the predefined off-track values at which the gain measurements are to be made. Furthermore, the preferred disk drive conventionally calculates $$\frac{1}{|G|}$$

as part of the torque constant calibration and saves it in a register. So, all that is required is to read this single register after the open loop gain command is issued. Observe that although the M actual positions, $\{x_i\}_{i=1}^M$, are unknown, the M gain measurements, $\{G(x_i)\}_{i=1}^M$, are obtainable by the open loop gain measurement procedure explained above.

Ultimately, the linearity compensation coefficients $a_1, b_1, a_2, b_2, \ldots a_N, b_N$ which define the correction function h(p) for use with a particular head are found from Comp_cls, as follows:

$$LinComp = \frac{1}{Comp\_cls(1)} * Comp\_cls(2 \cdots 2N+1) \quad (32)$$

$$= \frac{1}{sf} * Comp\_cls(2 \cdots 2N+1)$$

$$= \begin{bmatrix} b_1 \\ a_1 \\ \vdots \\ b_N \\ a_N \end{bmatrix}$$

where Comp_cls(1), the first element of the vector Comp_cls is the constrained least square estimate of the scale factor sf and LinComp is the vector of truncated Fourier series coefficients $a_1, b_2, a_2, b_2, \ldots a_N, b_N$ found in the constrained least square sense.

III. Iterative Features

A unique aspect of the present invention is the fact that the process of determining compensation coefficients may be implemented iteratively, the resulting coefficients getting closer and closer to optimum after each iteration. This is possible because the correction function h(p) is additive. The process may begin with compensation coefficients equal to zero, but the preferred method starts with non-zero coefficients that are near the coefficients-expected for a particular disk drive model. It may also be desired to limit the number of iterations.

In the preferred embodiment, therefore, we start with default compensation coefficients and iterate until the range of gain values is acceptable or until we have achieved a maximum number of permissible iterations. In the preferred embodiment, we always measure the gains twice and sometimes three times, as suggested by the pseudocode of Appendix C.

IV. Using the Correction Function

Once we have the linearity compensation coefficients $a_1, b_1, a_2, b_2, \ldots a_N, b_N$ which define the correction function h(p) for particular head, we may use the coefficients "on the fly" to calculate an estimated position $\hat{x}$ from a measured position p (processing resources permitting) or use the coefficients to create and store a lookup table having measured position p as an input key and estimated position $\hat{x}$ as an output (memory resources permitting).

a. Interpolated Lookup Table

The presently preferred system creates a reduced-size lookup table by evaluating the correction function h(p) at some interval between −0.25 and +0.25, storing the evaluated values in the lookup table, and then evaluating the lookup table during use by way of linear interpolation.

Appendix B shows pseudocode for interpolating linearization values is from a lookup table. Tradeoffs are still present. If memory resources are sufficient, then the interval can be small and the number of table entries large such that the interpolation process will introduce relatively little error. On the other hand, if memory resources are scarce as in the first disk drive incorporating this invention, then the interval must be relatively large in order to reduce the number of table entries and the use of linear interpolation may introduce a substantial error in the correction function h(p) when it is interpolated at points away from the values of p where h(p) was calculated and stored in the table.

b. Improved Lookup Table

A further aspect of this invention is reducing the interpolation error by finding a new set of table entries such that the least squared error between the desired correction function h(p) and the linearly interpolated values is minimized while relaxing the end point constraints to merely be the same, rather than necessarily equal to zero, as originally specified in the constraining equations (16A and 16B). This is possible because non-zero end points are not perfect, but they will still maintain the continuity from PES segment to PES segment so long as such end points are equal.

In the preferred system, we are looking for samples (8 to 16) whose linear interpolation is close (in the least square sense) to the desired correction function h(p) where the first and last sample values are the same. Therefore, the support of the correction function h(p) is subdivided into $L_1$ (e.g. 8 to 16) equal partitions or intervals that each contain $L_2$ (e.g. 16) uniform samples. Consequently, we end up with a (L×1) vector of correction function values, h, where $L=L_1 \times L_2$.

We define the following as an indicator function:

$$1_{I_k}(p) = \begin{cases} 1, & \text{if } p \in I_k \\ 0, & \text{otherwise} \end{cases} \quad (33)$$

Then, the linear piecewise approximation to the correction function h(p) passing through the points $d_1, \ldots d_{L_1}$ may be expressed as:

$$h(p) \cong \sum_{k=1}^{L_1} \left( \frac{d_{k+1} - d_k}{p_{k+1} - p_k}(p - p_k) + d_k \right) 1_{I_k}(p) \quad (34)$$

where $I_k = [p_k, p_{k+1})$ for $k \in \{1, \ldots, L_1\}$. Next, consider the $L_1$ partitions $[p_1, p_2), [p_2, p_3), \ldots, [p_{L_1}, p_{L_1+1})$, then define an (L×1) vector h and an (L×2N) matrix V as:

$$h = \begin{bmatrix} h(p_{1,1}) \\ h(p_{1,2}) \\ \vdots \\ h(p_{1,L_2}) \\ h(p_{2,1}) \\ \vdots \\ h(p_{2,L_2}) \\ \vdots \\ h(p_{L_1,1}) \\ \vdots \\ h(p_{L_1,L_2}) \end{bmatrix} = V * LinComp \quad (35)$$

and $$V = \begin{bmatrix} \cos(\omega p_{1,1}) & \sin(\omega p_{1,1}) & \cdots & \cos(N\omega p_{1,1}) & \sin(N\omega p_{1,1}) \\ \vdots & & \ddots & & \vdots \\ \cos(\omega p_{L_1,L_2}) & \sin(\omega p_{L_1,L_2}) & \cdots & \cos(N\omega p_{L_1,L_2}) & \sin(N\omega p_{L_1,L_2}) \end{bmatrix} \quad (36)$$

where $p_{i,1}=p_i$ and the $p_{i,j}$'s are the domain sample values for $i=1,2,\ldots,L_1$ and $j=1,2,\ldots,L_2$. Further, consider the $L_1$ unknown parameters $d_1, \ldots, d_{L_1}$ whose linear interpolation is the (best) fit to the correction function h(p) in the least square sense. It is assumed that the value of the (linear) least square fit at $p_{L_1+1}$ is equal to $d_1$ (i.e. $d_{L_1+1}=d_1$) thereby enforcing the embedded constraint that the value of the lookup table at $p_1$ and $p_{L_1+1}$ must be the same in order to preserve continuity after applying correction going from quarter track to quarter track to the next. Moreover, the (best) least square error estimate to the unknown parameters $d_1, \ldots, d_{L_1}$ provide the (best) linear least square fit to the correction function h(p) (as derived above); thus, forming the lookup table values evaluated at $p_1, \ldots p_{L_1}$. Next, define the least square L×$L_1$ matrix A as:

$$A = \begin{bmatrix} 1-\frac{(p_{1,1}-p_1)}{p_2-p_1} & \frac{(p_{1,1}-p_1)}{p_2-p_1} & 0 & \cdots & 0 \\ \vdots & \vdots & \vdots & \cdots & \vdots \\ 1-\frac{(p_{1,L_2}-p_1)}{p_2-p_1} & \frac{(p_{1,L_2}-p_1)}{p_2-p_1} & 0 & \cdots & 0 \\ \hline 0 & 1-\frac{(p_{2,1}-p_2)}{p_3-p_2} & \frac{(p_{2,1}-p_2)}{p_3-p_2} & \cdots & 0 \\ \vdots & & & \cdots & \vdots \\ 0 & 1-\frac{(p_{2,L_2}-p_2)}{p_3-p_2} & \frac{(p_{2,L_2}-p_2)}{p_3-p_2} & \cdots & 0 \\ \hline \vdots & \vdots & \vdots & \cdots \ddots & \vdots \\ \hline \frac{(p_{L_1,1}-p_{L_1})}{p_{L_1+1}-p_{L_1}} & 0 & \cdots & \cdots & 1-\frac{(p_{L_1,1}-p_{L_1})}{p_{L_1+1}-p_{L_1}} \\ \vdots & \vdots & \cdots & \cdots & \vdots \\ \frac{(p_{L_1,L_2}-p_{L_1})}{p_{L_1+1}-p_{L_1}} & 0 & \cdots & \cdots & 1-\frac{(p_{L_1,L_2}-p_{L_1})}{p_{L_1+1}-p_{L_1}} \end{bmatrix} \quad (37)$$

and $$LookupTable = \begin{bmatrix} d_1 \\ d_2 \\ \vdots \\ d_{L_1} \end{bmatrix} = LookupTableArray * h \quad (38)$$

where $$LookupTableArray = (A'^{*}A)^{-1}*A'. \quad (39)$$

It turns out that since $A_{cls}$ and LookupTableArray can be pre-computed, it is possible to calculate table lookup values in one step. The size of the $A_{cls}$ and LookupTableArray matrices are a function of the number of Fourier series harmonics and number of points at which we calculate the correction function h(p). These dimensions fall out of the calculation of the one step array. In other words, we can use arbitrarily large offline precision to calculate $A_{cls}$, but the matrix that must be used to calculate the table lookup tables in firmware need only $(L_1+1)\times M$ where $L_1$ is the number of table entries and M is the number of gain measurements.

Furthermore, this implies that since most of the computations can be performed off-line (via the newly devised algorithm), we could have used any other basis function that might outperform the currently preferred truncated Fourier series basis, e.g., we could have considered a polynomial, spline or wavelet series representation of the correction function h(p) and equivalently carried on the same procedure without requiring any change to either the Intelligent Burn In (IBI) code, used during disk drive manufacturing self-test, or the servo code. A different choice of the basis function, other than the truncated Fourier series, for representing the correction function h(p) might provide a better representation or approximation to the amount of MR nonlinearities or head sensitivities observed by ways of measuring the open loop gain of the demodulator as described before.

The one step calculation is explained as follows. We partition the matrix $A_{cls}$ in the following way:

$$A_{cls} = \begin{bmatrix} A_{cls}(1,:) \\ Z \end{bmatrix} \quad (40)$$

where $A_{cls}(1,:)$ is the first row of $A_{cls}$ and Z is the matrix constructed by the rest of the rows of $A_{cls}$. The OneStepArray can then be obtained as:

$$OneStepArray = \begin{bmatrix} A_{cls}(1,:) \\ W \end{bmatrix} \quad (41)$$

where $$W = LookupTableArray*V*Z \quad (42)$$

The OneStepArray is the final $(L_1+1)\times M$ matrix that needs to be saved to be used in the IBI code. In the presently preferred system $L_1=16$ and $M=140$ such that the OneStepArray is a 17 by 140 matrix. Observe that the size of the matrix OneStepArray is independent of the order of the truncation N. In other words, whether we choose N=12 or N=100, the OneStepArray will still remain a 17 by 140 matrix to be read and used in the IBI code where increasing N only increases the time complexity of the off-line calculations of the OneStepArray with no impact to either the IBI or servo code operations. This is another inherent feature of our embodiment. Finally, to find the ultimate vector of LookupTable values, the OneStepArray is initially multiplied by the gain measurement matrix F to create an intermediate matrix U, an $(L_1+1)\times 1$ vector which contains the scale factor sf as its first element and the scaled truncated Fourier series coefficients as its remaining elements, i.e.

$$U = OneStepArray*F \quad (43).$$

Significantly, the only major algebraic manipulation that the IBI code needs to do is to multiply OneStepArray by the vector F to form U. After obtaining the intermediate matrix U of dimension $(L_1+1)\times 1$, the vector of LookupTable values of dimension $(L_1\times 1)$ is easily obtained as:

$$LookupTable = \frac{U(2,\cdots,L_1+1)}{U(1)} \quad (44)$$

where the first element is the constrained least square estimate of the scale factor (i.e. U(1)=sf), all performed as part of the IBI code.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

APPENDIX A

PES Construction Firmware (Pseudocode)

```
PES_calc( ) {
#define TRK_SCALE     13;              // use 3,13 scaling
int PES, halftrack, cyl, A,B,C,D
long acc, t, p
if (headswitch)
      loadLookupTable (head);
halftrack = (2^TRK_SCALE) /2
cyl=getTID( ) ;                        // read in 14 bit track ID
A = getburstA ( ) ;
B = getburstB ( ) ;
C = getburstC ( ) ;
D = getburstD ( ) ;
CdubD = C-D;
AsubB = A-B;
if (|CsubD| <= |AsubB|) {              // use C-D in numerator
      acc = (long) (CsubD) shl TRK_SCALE;   // 32 bit version of C-D
                                            // shifted left by TRK_SCALE
      acc = -1 * acc;                       // inverted
      P=acc/AsubB;                          // calc P=-1*(C-D)/(A-B)
      halfTrack = 0; }                      // don't add/sub half a track
else {                                 // use A-B in numerator
      acc = (long) (AsubB) shl TRK_SCALE;   // 32 bit version of A-B
                                            // shifted left by TRK_SCALE
      P=acc/CsubD                           // calc P=(A-B)/(C-D)
      if (cyl mod 2 == 1)                   // add/sub half a track
            halfTrack = -1*halfTrack; }
acc = lookuptable (P) shl 14;          // use the lookup table to
                                       // add linearity correction!
                                       // Note that P ranges from -1 to +1
P= acc shr 4;                          // P = P/4, i.e. divide P by 4
                                       // to scale P in servo tracks
P = P + halfTrack                      // add/sub half a track as required
PES = (cyl - cylDest) shl TRK_SCALE;
PES = PES + P;
PES = PES-trackOffset-microjog-inject;
return PES;
}
```

APPENDIX B

Table Lookup Firmware (Pseudocode)

```
int lookuptable (int P)
{
#define TBLEN    12                    // number of partitions (2-16), 12 in this case
#define SACH     16                    // What is this?
int Pscl, pnt, actLoc
long acc, t, p
// pseudocode using floating point math
//-----------------------------------------------------
//P is scaled as a 3,13 integer
// table is scaled as 3,13 integers
//
//      Pscl = P * tblen/16            // only non-binary multiply needed
//
//      pnt=(P+1) *tblen/2             // map -1 to +1 ==> 0 to 12
//      pnt = Pscl*8 + tblen/2         // alternative way #1
//      pnt = (Pscl + tblen/16) * *    // alternative way #2 wherein mult
//
//
// algebraic interpolation
//      loc =  (y2 - y1)/(x2-x1)*(x-x1) + y1
//      loc =  (table(pnt+1) - table(pnt))*(tblen/2)   * (P - pnt*2/tblen + 1 )    + table(pnt)
//          =  (table(pnt+1) - table(pnt))             * (P*tblen/2  - pnt + tblen*2)  + table(pnt)
/
//          =  (table(pnt+1) - table(pnt))             * Pscl*8      - pnt + tblen*2)  + table(pnt)
/
//      actLoc = P + loc
//      Return actLoc
//-----------------------------------------------------
// preferred pseudocode using high speed shifting capability of DSP
//-----------------------------------------------------
```

APPENDIX B-continued

Table Lookup Firmware (Pseudocode)

```
t = P * (long) (TBLEN shl 12);              // scaled 3,13 P
Pscl = (int) (t shr SACH);
acc = Pscl shl 6;                           // get 16,0 pointer
pnt = acc shr SACH;
pnt = pnt + TBLEN/2;
t = table(pnt+2) − table(pnt+1);            // do linear interpolation
p = Pscl − (long) (pnt*2^10) + (long) (TBLEN*2^9);
acc = (t * P) shr SACH;
acc = acc + table (pnt+1);
actLoc = P + acc                            // add correction to P
return actLoc
} }
```

APPENDIX C

Iterative Firmware (Pseudocode)

```
Load default compensation value into servo RAM lookup table.
Measure gain with default compensation values.
        Calculate the range of gain values. Call this range1.
        Calculate the compensation correction values for these gain measurements. Call this comp1.
Measure gain with comp1 compensation values.
        Calculate the range of gain values. Call this range2.
        If range2 < range1
                range=range2
                comp=comp1
        else
                range=range1
                comp=default
        if range < criteria
                return
        Calculate new compensation correction values for these gain measurements.
        Add the new values to the old values. Call this comp.2
Measure gain with comp2 compensation values
        Calculate the range of gain values. Call this range3
        If range3 < range
                comp=comp2
Write updated compensation values, comp, to reserved area.
Return.
```

We claim:

1. In a disk drive having a disk, a transducer, and an embedded servo control system including a servo sector having a first burst pair and a second burst pair, a method of constructing a position signal reflecting a position of the transducer relative to the servo sector, the method comprising the steps of:

obtaining a measured position p relative to a first burst pair centerline wherein the measured position p ranges within a first fractional PES segment from a first measured endpoint position $p_{START}$ on a first side of the first burst pair centerline to a second measured endpoint position $p_{END}$ on a second side of the first burst pair centerline, the first and second measured endpoint positions being equal in magnitude and opposite in sign such that the first fractional PES segment is continuous at a segment junction formed with a second fractional PES segment associated with a second burst pair centerline located adjacent to the first burst pair centerline; and deriving an estimated position $\hat{x}$ that more closely corresponds to a true position x by compensating for non-linearities in the measured position p at positions with values in between the first and second measured endpoint positions, while keeping the first and second endpoint values equal in magnitude and opposite in sign to keep the first fractional PES segment continuous with the second fractional PES segment, wherein the servo control system provides a primary position signal waveform P from the first burst pair and a quadrature position signal waveform Q from the second burst pair and wherein the step of obtaining a measured position p relative to a first burst pair centerline comprises the step of constructing the fractional PES segment from a ratio of the P and Q position signal waveforms, and wherein the step of constructing a fractional PES segment from a ratio of the P and Q position signal waveforms comprises the steps of:

determining whether the transducer is closer to the first burst pair centerline or the second burst pair centerline; and if the transducer is closer to the first burst pair centerline, constructing a fractional PES segment from a first ratio of the P and Q position signal waveforms; else if the transducer is closer to the second burst pair centerline, constructing the fractional PES segment from a second ratio of the P and Q position signal waveforms.

2. The method of claim 1 wherein the step of deriving an estimated position $\hat{x}$ that more closely corresponds to a true position x while keeping the first fractional PES segment continuous with the second fractional PES segment comprises the steps of:

(a) defining an estimation function $\hat{x}=c(p)=p+h(p)$ which estimates a true position x, where $\hat{x}$ is an estimated position, c(p) is an estimation function, p is a measured position, and h(p) is a correction function;

(b) approximating the correction function h(p) with an equation defined by a plurality of coefficients over a range of measured positions from the measured endpoint position $p_{START}$ to the second measured endpoint position $p_{END}$;

(c) deriving a unitary gain function by differentiating the correction function c(p) as a function of actual position x and setting it equal to one such that:

$$\frac{\partial c(p)}{\partial x} = \frac{\partial c(p)}{\partial p}\frac{\partial p}{\partial x} = \frac{\partial c(p)}{\partial p}g(x) = \frac{sf \partial c(p)}{\partial p}\frac{g(x)}{sf}$$

$$= \frac{sf \partial c(p)}{\partial p}G(x) = 1$$

where $$g(x) = \frac{\partial p}{\partial x}$$

is closed loop PES gain, G(x) is open loop gain, and sf is a "scale factor" that relates the open loop gain G(x) to the closed loop PES gain g(x); and (d) deriving the coefficients of the correction function h(p) by:

(1) positioning the transducer at a plurality of measured positions $p_I$ relative to a burst pair centerline of a pair of servo bursts;

(2) measuring the open loop gain $G(x_i)$ of the system for each of the measured positions $p_i$;

(3) substituting the plurality of measured positions $p_I$ and open loop gains $G(x_i)$ into a corresponding plurality of unitary gain equations; and (4) determining the plurality of coefficients that best fit the plurality of unitary gain equations while simultaneously providing estimated positions at the first and second measured endpoint positions $p_{START}$ and $p_{END}$ such that $c(p_{START})=p_{START}$ and $c(p_{END})=p_{END}$.

3. The method of claim 1 wherein the first and second burst pair centerlines are nominally separated from one another by ½ of a servo track pitch and wherein the first and second measured endpoint positions $p_{START}$ and $p_{END}$ are equal to ±¼.

4. The method of claim 1 wherein the deriving step comprises the steps of creating a lookup table with the measured position p as an input and the estimated position $\hat{x}$ as an output.

5. The method of claim 4 wherein the lookup table is reduced in size through the steps of:

populating the lookup table with a reduced number of entry pairs comprising measured positions p and estimated positions $\hat{x}$;

interpolating between the entry pairs.

6. A method of determining an indicated position signal corresponding to a radial position of a read head over a rotating disk in a magnetic disk drive, the method implemented in a disk drive including a rotating disk and a read head for reading servo information from the rotating disk, the servo information including a servo pattern of four circumferentially successive, radially repeating servo bursts A,B,C,D that are arranged in quadrature to define an alternating plurality of AB and CD burst pair centerlines that are nominally spaced from one another by ½ servo track pitch units, the method comprising the steps of:

reading four servo bursts A,B,C,D with the read head;

determining whether the read head is closer to an AB burst pair centerline or to a CD burst pair centerline; and causing the fractional track PES value to equal ±¼ track pitch units at a commutation position midway between the AB and CD burst pair centerlines regardless of whether or not those centerlines are separated by ½ servo track pitch units by constructing a fractional PES value as $$P = -\frac{1}{4}\frac{(C-D)}{(A-B)}$$

when the read head is closer to the CD burst pair centerline within a first fractional PES segment and as $$P = +\frac{1}{4}\frac{(A-B)}{(C-D)}$$

when the read head is closer to the AB burst pair centerline within a second fractional PES segment, the first and second fractional PES segments continuously connected to one another at the commutation position to form an indicated position signal; and linearizing the fractional PES values within the fractional PES segments while keeping the fractional track PES values equal to one another at the commutation positions and keeping the indicated position signal continuous.

7. The method of claim 6 wherein the step of determining whether the read head is closer to the AB burst pair centerline or the CD burst pair centerline is accomplished by comparing |A−B| with |C−D|.

8. The method of claim 6 wherein the four servo bursts A,B,C,D are arranged in a half track pattern.

9. The method of claim 6 wherein the four servo bursts A,B,C,D are arranged in a ⅓, ⅓, ⅓ pattern.

10. The method of claim 6 wherein the linearizing step comprises the steps of:

defining a linearity correction function having a plurality of coefficients for use in producing an estimated position based on a measured position over a range of −¼ servo track pitch units to +¼ servo track pitch units relative to a burst pair centerline;

obtaining a plurality of open loop gain measurements at a plurality of off-track position relative to a corresponding plurality of burst pair centerlines;

calculating the plurality of coefficients of the linearity correction function based on the plurality of open loop gain measurements while ensuring that the estimated positions corresponding to the measured positions ±¼ servo track pitch units relative to a burst pair centerline remain equal to one another.

11. The method of claim 10 wherein the calculating step ensures that the estimated positions corresponding to the measured positions of ±¼ track pitch units relative to a burst pair centerline remain exactly equal to ±¼.

12. The method of claim 10 wherein the calculating step ensures that the estimated positions corresponding to the measured positions of ±¼ track pitch units relative to a burst pair centerline remain equal to one another but not necessarily equal to ±¼.

13. The method of claim 10 wherein the linearizing step comprises the further steps of:
   evaluating the correction function at a plurality of positions in the range of −¼ track pitch units to +¼ servo track pitch units; and
   developing a lookup table based on the results of the evaluating step.

14. The method of claim 13 wherein the linearizing step comprises the further steps of:
   obtaining a measured position;
   identifying two elements in the lookup table which surround the measured position; and
   interpolating between the two elements in the lookup table to produce an estimated position.

15. The method of claim 13 wherein the linearizing step comprises the further steps of:
   evaluating the correction function at a plurality of measured positions over a predetermined number of intervals; and
   optimizing the boundaries of the intervals such that the interpolations provided by the lookup table best fit the correction function in a least square sense.

16. In a disk drive having a disk, a transducer, and an embedded servo control system including a servo sector having a primary burst pair joined at a primary burst pair centerline and a quadrature burst pair joined at a quadrature burst pair centerline, wherein the servo control system derives a primary position signal waveform from the primary burst pair and a quadrature position signal waveform from the quadrature burst pair, wherein the servo control system provides fractional PES segments that are subject to discontinuity when they are joined at a commutation position to form an indicated position signal, a method for producing a discontinuity-corrected position signal from the fractional PES segments, the method comprising the steps of:
   determining whether the transducer is closer to the primary burst pair centerline or the quadrature burst pair centerline; and
   if the transducer is closer to the primary burst pair centerline, constructing a fractional PES value from a first ratio of the primary and quadrature position signal waveforms; else
   if the transducer is closer to the quadrature burst pair centerline, constructing the position signal from a second ratio of primary and quadrature position waveforms; and
   applying a linearity correction to the fractional PES value which is applied independently of a width of the transducer and regardless of whether the transducer is nearer either burst pair centerline or the commutation position;
   whereby the indicated position signal is continuous at the commutation position and substantially linear between the commutation position and an adjacent commutation position.

* * * * *